US012789160B2

(12) United States Patent
Tontiwachwuthikul et al.

(10) Patent No.: US 12,789,160 B2
(45) Date of Patent: Nov. 10, 2026

(54) METHODS AND SYSTEMS FOR SPOUTED BED AND JET FLOW SOLVENT REGENERATION

(71) Applicant: Entropy Inc., Calgary (CA)

(72) Inventors: Paitoon Tontiwachwuthikul, Regina (CA); Congning Yang, Regina (CA); Puttipong Tantikhajorngosol, Regina (CA); Teerawat Sema, Muaklek (TH); Tianci Li, Regina (CA)

(73) Assignee: Entropy Inc., Calgary (CA)

( * ) Notice: Subject to any disclaimer, the term of this patent is extended or adjusted under 35 U.S.C. 154(b) by 383 days.

(21) Appl. No.: 18/599,448

(22) Filed: Mar. 8, 2024

(65) Prior Publication Data

US 2024/0299895 A1 Sep. 12, 2024

(30) Foreign Application Priority Data

Mar. 10, 2023 (CA) ................................ CA 3192529

(51) Int. Cl.
*B01D 53/02* (2006.01)
*B01D 53/14* (2006.01)
*B01J 4/00* (2006.01)
*B01J 8/24* (2006.01)

(52) U.S. Cl.
CPC .......... *B01J 8/245* (2013.01); *B01D 53/1425* (2013.01); *B01J 4/002* (2013.01); *B01D 2257/504* (2013.01); *B01D 2259/40083* (2013.01); *B01J 2208/00203* (2013.01); *B01J 2208/00902* (2013.01)

(58) Field of Classification Search
CPC .... B01D 2257/504; B01D 2259/40083; B01D 53/1425; B01D 53/1475; B01J 2208/00203; B01J 2208/00902; B01J 4/002; B01J 8/245
See application file for complete search history.

(56) References Cited

U.S. PATENT DOCUMENTS

| | | | | |
|---|---|---|---|---|
| 8,728,428 B1 * | 5/2014 | Heidel | B01D 9/0036 423/432 |
| 10,654,009 B1 * | 5/2020 | Yelvington | B01J 8/386 |
| 2004/0253159 A1 * | 12/2004 | Hakka | B01D 53/1493 423/228 |
| 2008/0181835 A1 * | 7/2008 | Mason | G21F 9/32 423/249 |
| 2012/0000175 A1 * | 1/2012 | Wormser | C10K 1/026 60/39.12 |
| 2017/0182458 A1 * | 6/2017 | Jiang | B01D 53/1493 |

* cited by examiner

*Primary Examiner* — Christopher P Jones
(74) *Attorney, Agent, or Firm* — Berg Hill Greenleaf Ruscitti LLP

(57) ABSTRACT

An apparatus for solvent regeneration in carbon capture processes is provided. The apparatus comprises one or more of: (a) a spouted fluid bed reactor with one or more of: (i) a cylindrical shape; (ii) a removable draft tube; (iii) a removable cone base; (iv) a removable nozzle; (v) at least one steam/vapor inlet and at least one steam/vapor outlet; and (vi) at least one liquid inlet and at least one liquid outlet; or (b) an apparatus comprising (i) a spouted fluid bed reactor with a removable conical base and removable draft tube; (ii) at least one reboiler; (iii) a vapor monitoring system; and (iv) a liquid monitoring system. Also disclosed are processes for the separation of $CO_2$ from $CO_2$-containing amine solvents using such apparatus, and methods of using such apparatus.

1 Claim, 23 Drawing Sheets

METHODS AND SYSTEMS FOR SPOUTED BED AND JET FLOW SOLVENT REGENERATION

CROSS REFERENCE TO RELATED APPLICATION

This application claims the benefit of and priority to Canadian Patent Application No. 3,192,529, filed Mar. 10, 2023. The entire specification and figures of the above-referenced application are hereby incorporated, in their entirety by reference.

FIELD OF INVENTION

This present disclosure relates generally to methods and systems for solvent regeneration in carbon capture processes.

BACKGROUND OF THE INVENTION

Post-combustion $CO_2$ capture (PCCC) is a mature technology, which aims to separate $CO_2$ from a flue gas stream released from industrial processes. PCCC is currently the most promising and mature strategy for $CO_2$ capture from industrial processes and can be either retrofitted into existing traditional large-scale fossil fuel-fired power plants or built as end-of-pipe removal technology for new plants.

Chemical absorption of $CO_2$ is a typical process in PCCC by using chemical solvents that are compatible with the composition of the flue gas stream and heats and pressures involved in the particular PCCC process. The principle of chemical absorption involves a reversible chemical reaction of $CO_2$ with a chemical solvent in an absorption column, which can form a strong chemical bond between the solvent and the $CO_2$. Then the chemical bond is broken to release the captured $CO_2$ upon exposure to high temperature (~120° C.) in a stripper column (or desorber column, or regenerator), and the regenerated lean amine solvent solution can be circulated back through the system for another absorption process. The types of potentially usable chemical solvents are diverse, such as: aqueous amine solvents, ionic liquids, non-aqueous amine solvents, ionic liquids with amine solvents, and others. Aqueous amine solvents are widely considered to be favourable for use in PCCC processes, due to their comparably low price. The typical amine solvents used in PCCC processes are monoethanolamine (MEA), 2-amino-2-methyl-1-propanol (AMP), and piperazine (PZ). Unfortunately, a common drawback is that amine solvents with great absorption kinetics in the absorption process generally have poor desorption kinetics in the regeneration process. The energy requirement for the solvent desorption process for these solvents is very large.

Therefore, there is a need to develop an advanced process to reduce the energy penalty associated with desorption for amine solvents that have a greater absorption capacity. In particular, there is a need to develop a process that has one or more of the following desirable properties for the $CO_2$ desorption process: increased heat transfer, increased mass transfer, and enhanced activity of active solid particles such as solid acid catalysts. Such a process would improve the desorption kinetics for amine solvents and, therefore, allow PCCC to be viable for small-scale industrial facilities, which it currently is not.

A three-phase spouted bed is a gas-liquid-solid contactor in which gas is introduced vertically as an auxiliary fluid through a centrally located single orifice at a cylindrical or conical vessel distributor, in which static coarse particles (≥1 mm) can be circulated systematically inside the vessel. When the gas injection rate is high enough to become a high-velocity jet, it will penetrate the bed of particles to form a central spout zone, a fountain beyond the peripheral bed level, and a surrounding annulus region. A systematic cyclic loop movement is thus established, which comprises a dilute phase central core with vertical-moving solids carried by a concurrent flow of fluid, and a dense phase annular region with countercurrent percolation of fluid.

A two-phase spouted bed is a gas-liquid contactor in which lean solvent vapour, which has been heated in a reboiler, is introduced vertically as an auxiliary fluid through a centrally located single orifice at a cylindrical or conical vessel distributor. The incoming hot vapour forms a jet which entrains and heats the injected liquids to create the conditions for turbulent flow and a central spout zone, a fountain beyond the peripheral bed level, and a surrounding annulus region. The draft tube assists the jet flow straight upward to generate a preferred height of the fountain. The bubbles in the annulus region comprise gas $CO_2$, injected vapor, and vaporized liquid.

In general, the invention relates to spouted bed and jet flow (SBJ) processes using of a spouted-fluid bed reactor with a conical base as a solvent regenerator to promote $CO_2$ desorption from aqueous amine solvents. "Desorption" or "regeneration" or "stripping" is a thermal separation process, which aims to separate $CO_2$ from the liquid phase by heating the amine solvent. In a traditional thermal desorber column, a high-temperature environment can speed up the desorption kinetics, but excessively high temperature can cause serious thermal degradation of the amine solvent. With the aid of active solids (such as a solid acid catalyst), desorption kinetics can be promoted, allowing for $CO_2$ to be released at a relatively lower temperature. The activity of the solid particles used in amine regeneration typically depends on the contact between solid-liquid phases, the surface area and the acidic sites. With the nature of the spouting process, especially with multi-phase (vapour/liquid/solid) applications, the invention has particular application for enhancing the liquid-side mass transfer rate by increasing turbulence in the process, resulting in a lower energy requirement for $CO_2$ desorption. Certain preferred embodiments of the invention add to the desirable properties of the invention for $CO_2$ desorption. For example, adding a heating element surrounding at least a portion of the SBJ vessel promotes increased heat transfer in the $CO_2$ desorption process.

SUMMARY OF THE INVENTION

According to one aspect of the present invention, there is provided an apparatus for the separation of $CO_2$ from $CO_2$-containing amine solvents through desorption. Preferably, the apparatus comprises a spouted fluid bed reactor with one or more of: (a) a cylindrical wall defining a longitudinal axis and an internal diameter; (b) a removable draft tube; (c) a removable cone base; (d) a removable slotted nozzle; (e) at least one steam/vapor inlet and one steam/vapor outlet; (f) at least one liquid inlet and at least one liquid outlet; and (g) optionally, a heating element surrounding at least a portion of said reactor body.

According to a preferred embodiment of the present invention, there is provided an apparatus for the separation of $CO_2$ from $CO_2$-containing amine solvents through desorption and for the regeneration of energy. Preferably, the apparatus comprises: (a) a spouted fluid bed reactor with a conical base and draft tube; (b) at least one reboiler; (c) a vapor monitoring system; and (d) a liquid monitoring system.

According to a preferred embodiment of the present invention, the base is conical.

According to a preferred embodiment of the present invention, the nozzle is slotted.

According to a preferred embodiment of the present invention, the draft tube further comprises a heating element.

According to a preferred embodiment of the present invention, the draft tube comprises a heating coil.

According to a preferred embodiment of the present invention, the draft tube and heating element are connected to a heat source.

According to a preferred embodiment of the present invention, the heat source introduces a heating medium to the draft tube, which spent or depleted heating medium is directed into the heating element for waste heat recovery.

According to a preferred embodiment of the present invention, the reactor body is adapted to receive a solid particulate material therein.

According to a preferred embodiment of the present invention, the draft tube is removable.

According to a preferred embodiment of the present invention, the draft tube has a cylindrical shape and a smaller diameter than an internal diameter of the reactor body.

According to a preferred embodiment of the present invention, the base is removable.

According to a preferred embodiment of the present invention, the nozzle is removable.

According to one aspect of the present invention, there is provided a spouted fluid bed reactor adapted to receive a liquid phase, a gas phase and optionally a solid phase, integrated with a conventional thermal solvent regenerator to remove $CO_2$ from a $CO_2$-containing amine solvent stream.

According to a preferred embodiment of the present invention, the spouted fluid bed reactor is adapted to receive a solid phase wherein the solid phase comprises a type of solid particles that promote the $CO_2$ desorption kinetics.

According to a preferred embodiment of the present invention, the spouted fluid bed reactor is adapted to receive a solid phase wherein the solid phase is selected from the group consisting of: a solid catalyst; a nanoparticle; and combinations thereof.

In some preferred embodiments of this invention, the apparatus may be fitted (or incorporated) to any existing gas processing plants or $CO_2$ capture units, to reduce the lean $CO_2$ loading in the system.

In some preferred embodiments of this invention, the spouted fluid bed reactor may be fitted (or incorporated) to any existing gas processing plants or $CO_2$ capture units, to reduce the lean $CO_2$ loading in the system.

In some preferred embodiments, the spouted fluid bed reactor comprises three phases (liquid, gas, and solid), which is integrated with a conventional thermal solvent regenerator to remove $CO_2$ from a solvent stream. Preferably, the solid phase may comprise any type of solid particles that promote the $CO_2$ desorption kinetics such as a solid catalyst or nanoparticles.

According to one aspect of the present invention, there is provided a process comprising the following steps:

(a) introducing a solid particulate material to an empty spouted bed reactor comprising:
   (i) a reactor body having a cylindrical wall defining a longitudinal axis and an internal diameter, said reactor body comprising: a base, an inlet orifice, and a top;
   (ii) a draft tube defining an inlet and an outlet positioned centrally along said longitudinal axis within and connected to said reactor body and said inlet being positioned proximal to said inlet orifice;
   (iii) a nozzle located at said base of, and optionally protruding through said base into, the reactor body and positioned to accept steam/vapour from at least one steam/liquid inlet and feed such steam/vapour into said base;
   (iv) said at least one steam/vapor inlet fluidly connected to said nozzle;
   (v) at least one liquid inlet fluidly connected to the nozzle;
   (vi) at least one liquid outlet proximal to said top of the reactor body; and
   (vii) optionally, a heating element surrounding at least a portion of said reactor body;

(b) diverting a first portion of a lean solvent stream directly to said liquid inlet of said spouted bed reactor, wherein said lean solvent comprises $CO_2$;

(c) introducing a second portion of said lean solvent stream to a first reboiler of a thermal solvent regenerator, wherein said first reboiler provides a first outlet stream and a second outlet stream, wherein said first outlet stream is directed to a crosshead heat exchanger followed by a $CO_2$ absorption unit, and said second outlet stream is directed to said thermal solvent regenerator;

(d) allowing sufficient residence time of said first portion of a lean solvent stream in the spouted bed reactor to remove a predetermined amount of $CO_2$ from said $CO_2$-containing amine solvents, thereby generating a processed lean solvent, said processed lean solvent exiting the spouted bed reactor at a said liquid outlet thereof;

(e) introducing said processed lean solvent to a second reboiler to generate hot vapor, wherein said second reboiler provides a first outlet stream and a second outlet stream, wherein said first outlet stream is introduced to said base of said spouted bed reactor through said nozzle and said second outlet stream is directed to said crosshead heat exchanger followed by said $CO_2$ absorption unit;

(f) said hot vapor forming a turbulent flow when it combines with said first portion of said lean solvent, the turbulent flow causing said solid particulate material to flow upwards through the draft tube;

(g) upon exiting said draft tube the solid particulate material flows in a downward direction with the turbulent flow along an annulus formed between said draft tube and said cylindrical wall;

(h) adjusting the temperature of the hot vapor to be greater than the temperature of the first portion of said lean solvent; and (i) optionally, adjusting the split ratio of the lean solvent based on the operating conditions in the spouted bed reactor vessel wherein said operating conditions are selected from the group consisting of: temperature, flow rate, pressure, and solvent properties.

In some preferred embodiments, the spouted fluid bed reactor comprises two phases (liquid and gas), which is integrated with a conventional thermal solvent regenerator to remove $CO_2$ from a solvent stream.

According to one aspect of the present invention, there is provided a process comprising the following steps:

(a) splitting a lean solvent, wherein said lean solvent comprises $CO_2$, into a first lean solvent portion and a second lean solvent portion;
(b) introducing said first portion of said lean solvent directly to a liquid inlet of a spouted bed reactor comprising:
  (i) a reactor body having a cylindrical wall defining a longitudinal axis and an internal diameter, said reactor body comprising: a base, an inlet orifice, and a top;
  (ii) a draft tube defining an inlet and an outlet positioned centrally along said longitudinal axis within and connected to said reactor body and said inlet being positioned proximal to said inlet orifice;
  (iii) a nozzle located at said base of, and optionally protruding through said base into, the reactor body and positioned to accept steam/vapour from at least one steam/liquid inlet and feed such steam/vapour into said base;
  (iv) said at least one steam/vapor inlet fluidly connected to said nozzle;
  (v) at least one liquid inlet fluidly connected to the nozzle;
  (vi) at least one liquid outlet proximal to said top of the reactor body; and
  (vii) optionally, a heating element surrounding at least a portion of said reactor body;
(c) introducing a second portion of said lean solvent stream to a first reboiler of a thermal solvent regenerator, wherein said first reboiler provides a first outlet stream and a second outlet stream, wherein said first outlet stream is directed to a crosshead heat exchanger followed by a $CO_2$ absorption unit, and said second outlet stream is directed to said thermal solvent regenerator;
(d) allowing sufficient residence time of said first portion of a lean solvent stream in the spouted bed reactor to remove a predetermined amount of $CO_2$ from said $CO_2$-containing amine solvents, thereby generating a processed lean solvent, said processed lean solvent exiting the spouted bed reactor at a said liquid outlet thereof;
(e) introducing said processed lean solvent to a second reboiler to generate hot vapor, wherein said second reboiler provides a first outlet stream and a second outlet stream, wherein said first outlet stream is introduced to said base of said spouted bed reactor through said nozzle and said second outlet stream is directed to said crosshead heat exchanger followed by said $CO_2$ absorption unit;
(f) said hot vapor forming a turbulent flow when it combines with said first portion of said lean solvent, the turbulent flow causing said first portion of lean solvent to flow upwards through the draft tube;
(g) upon exiting said draft tube a first stream of said first portion of lean solvent flows toward said at least one liquid outlet and a second stream of said first portion of lean solvent flows in a downward direction with the turbulent flow along an annulus formed between said draft tube and said cylindrical wall;
(h) adjusting the temperature of the hot vapor to be greater than the temperature of the first portion of said lean solvent; and
(i) optionally, adjusting the split ratio of the lean solvent based on the operating conditions in the spouted bed reactor vessel wherein said operating conditions are selected from the group consisting of: temperature, flow rate, pressure, and solvent properties.

According to a preferred embodiment of the present invention, the heating element surrounding at least a portion of the reactor body improves the heat transfer within the apparatus. Turbulent flow inside the reactor body will promote the heating process because it speeds up the convection process. Once the hottest lean solvent has flowed to the surface, the evaporation process releases heat, which eventually promotes heat transfer.

According to a preferred embodiment of the present invention, hot vapor from the reactor body is introduced to a conventional thermal stripper, which will reduce the heat required in a reboiler in said conventional thermal stripper.

Advantageously, some preferred embodiments of the present invention are adaptable to different gas flow rates and liquid flow rates, and may accept a wide range of: nozzle sizes; draft tube diameters, lengths and coil sizes; and cone angles. Preferably, the range of gas flow rates is determined based on the vaporization rate of the solvent from a reboiler, which is affected by factors such as temperature, surface area of the liquid, vapor pressure over the liquid surface, liquid flow rate and fluid properties. A draft tube in a three-phase spouted bed reactor vessel serves as a gas chamber tube assembly to facilitate the motion of solid particles, increasing the contact between the liquid and the solid. The minimum gas flow rate is the lowest flow speed that forms spouted bed flow regimes. Preferably, the draft tube diameter is at most half the diameter of the reactor and approximately equal to the maximum size of the gas bubble at the cone base section. Preferably, the liquid flow rate is determined based on the overall temperature profile of the liquid in the solvent, the gas generation rate, the overall $CO_2$ removal efficiency and the size of the reactor.

The implementation of any one of the above aspects is intended to reduce the cost and energy penalty for the $CO_2$ desorption portions of the $CO_2$ capture process, as compared to a conventional thermal solvent regeneration process. The solvent may be any applicable chemical liquid solvent.

Liquid solvents used in conventional thermal solvent regeneration processes may be used in this novel solvent regeneration process.

BRIEF DESCRIPTION OF THE DRAWINGS

Features and advantages of the embodiments of the present invention will become apparent from the following detailed description, taken in combination with the appended figures in which.

DETAILED DESCRIPTION

The description which follows and the embodiments described therein are provided by way of illustration of an example or examples of particular embodiments of the principles of the present invention. In the following description of the invention, numerous examples are provided and specific details are set forth for the purposes of explanation and not limitation in order to provide a thorough understanding of the invention. Those that are skilled in the art will readily appreciate that the well-known methods, procedures and/or components will not be described as to focus on the invention in question. Accordingly, in some instances, certain structures and techniques have not been described or shown in detail in order not to obscure the invention.

Figure 1:
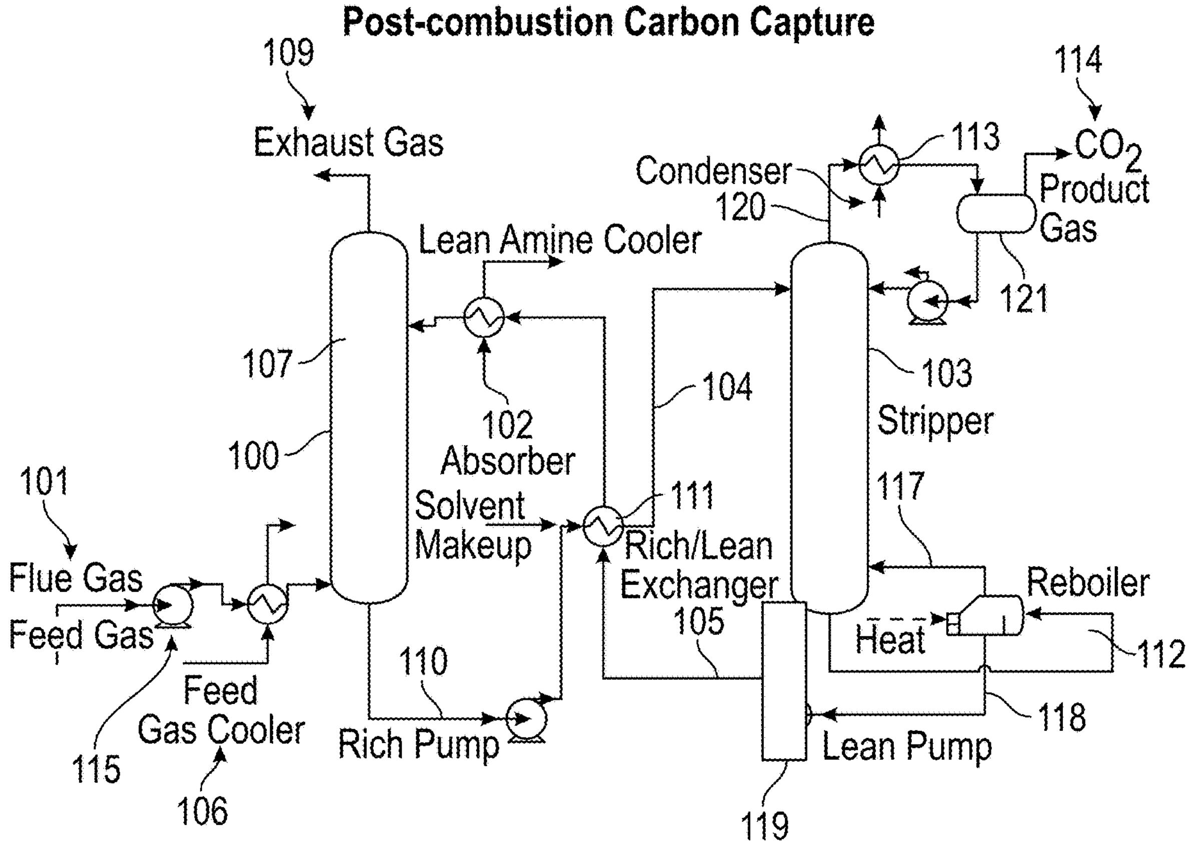
FIG. 1 is a schematic drawing of a conventional PCCC plant system, including an absorption unit where $CO_2$ is removed from a gas phase into a liquid solvent and a stripper/regeneration unit where the used, $CO_2$-rich solvent is recovered before being recycled back to the absorption unit.

A conventional PCCC plant system generally consists of two sections as illustrated in FIG. 1: (a) an absorption unit [100] where $CO_2$ is removed from a gas phase (the flue gas from the plant, which contains mainly nitrogen) [101] into a liquid solvent [102], which is an aqueous amine solution; and (b) a regeneration unit [103] where the used, $CO_2$-rich solvent [104] is recovered before being recycled [105] back to the absorption unit [100].

Before sending the flue gas [101] to the absorption unit [100], the flue gas stream [101] is pre-treated at a pre-treatment unit [115] to remove the impurities and hazardous substances such as nitrogen oxides, sulfur oxides and solid dusts. After that, the flue gas stream [101] enters a cooler [106] to bring it down to the desired temperature range (30-40° C.). After which, it is brought into contact with an aqueous amine solution [102] in the absorption unit [100]. Once the aqueous amine solution [102] contacts the flue gas stream [101], $CO_2$ in the flue gas stream [101] transfers across a gas-liquid interface into a liquid phase. The scrubbed gas [107] is discharged as treated exhaust gas [109]. The aqueous amine solution [102] reacts with, and absorbs, $CO_2$ to become rich solvent [110].

The rich solvent [110] is then sent to a rich/lean heat exchanger [111] for pre-heating. Next, the warm rich solvent [104] is introduced to a stripper column in the regeneration unit [103]. The rich solvent [104] absorbs more heat from a counter-current flow of hot steam (100-140° C.) generated by a reboiler [112], and the discharged heated rich solvent from the reboiler is split into a first stream [117] which is introduced into the bottom of the regeneration unit [103], and a second stream [118] which is sent to a lean pump [119]. This regeneration process promotes separation of $CO_2$ from the chemical solvents because it introduces heat into the process and a large amount of heat is required to break the strong chemical interaction between the $CO_2$ and the solvent. The components of the stripped gases (mainly $CO_2$, H2O vapor and amine solvent) [120] leave from the stripper [103] and flow to a condenser [113]. The condensate can be physically separated in a reflux drum [121], leaving the relatively pure $CO_2$ gas [114] available for further transportation and storage.

Chemical absorption of $CO_2$ has two advantages as a method of carbon capture: high solvent selectivity and $CO_2$ capture efficiency. Acid catalyst-aided $CO_2$ desorption is a novel approach to facilitate the $CO_2$ desorption kinetics for amine solvents. The efficiency of a catalyst-aided process is highly dependent on its Bronsted and Lewis acid sites ratio (B/L ratio) and proper mesoporous surface area (MSA). Taking a solid acid catalyst, HZSM-5, as an example, its Bronsted acid sites (BAS) can donate a proton to the carbamate ion and convert it to carbamic acid, and chemisorption on the Al site weakens the N—C bond causing $CO_2$ to break away. Once a proton is transferred to the bicarbonate ion, the $CO_2$ desorption rate will be sequentially faster. Lewis acid sites allow an attack on the high electron density of Nitrogen, which eventually weakens the N—C bond, causing $CO_2$ to break away. The mechanisms may be summarized into six major steps: (1) as a proton donor, the presence of the BAS donates a proton to the carbamate ion, carbamate receives a proton at its O atom and is converted to carbamate acid (AmineCOOH); (2) AmineCOOH reacts, through chemisorption, onto the surface of the solid catalyst; (3) isomerization to Zwitterion; (4) N—C bond stretching; (5) facilitating N—C bond breaking of carbamate breakdown; and (6) facilitating $CO_2$ separation.

The primary objective of the PCCC process is to optimize $CO_2$ capture efficiency with low capital expenditures (CAPEX) and operating expenditures (OPEX). In this case, improving $CO_2$ absorption capacity (cyclic capacity) and reducing thermal energy are the two key indicators. It has been reported that thermal energy consumption due to the extraction of steam for solvent regeneration accounts for almost 80% of the OPEX cost, which has been the major shortcoming during the practical operation of PCCC processes. It has been reported that about 70% of the energy required for operation of conventional PCCC processes is used for $CO_2$ stripping in the solvent regeneration portion of the process. To reduce the regeneration energy, an acid catalyst-aided solvent regeneration process is a promising technology. The traditional approach is to place the catalyst into a packed column as a fixed bed. However, catalytic efficiency is highly reliant on the mesoporous surface area (MSA) of the catalyst. The reduction of effective contact area between solvent and catalyst in a packed column placed as a fixed bed could negatively affect the catalytic efficiency, thereby requiring a greater number or volume of catalysts. In addition, the useful life of the catalyst is generally short. For industrial operations, the process of replacing catalysts in the stripper would be resource-intensive in terms of personnel usage, materials and costs.

Spouted fluidized beds ("spouted beds") have been used in industry applications such as coal carbonization, ore roasting, granulation and coating, due to their unique structural and hydrodynamic characteristics for favored heat and mass transfer, as compared to other fluidized beds. The use of spouted beds in a thermal gas separation process to remove $CO_2$ from a chemical liquid solvent is a novel process.

A conventional spouted bed is a three-phase gas-liquid-solid contactor in which gas is introduced vertically as an auxiliary fluid through a centrally located single orifice at a cylindrical or conical vessel distributor, allowing static coarse particles (≥1 mm) to be circulated systematically inside the vessel. When the gas injection rate is high enough to become a high-velocity jet, it will penetrate the bed of particles to form a central spout zone with a similar dimension to the inlet orifice, a fountain beyond the peripheral bed level, and a surrounding annulus region. The gas flows upward through the internal spout and fountain, and flares out into annulus zones, while the solid particles rise rapidly through the fountain core and fall down on the fountain periphery and the annulus as a loosely packed bed. A systematic cyclic loop movement is thus established, which comprises a dilute phase central core with vertical-moving solids carried by a concurrent flow of fluid, and a dense phase annular region with countercurrent percolation of fluid.

To allow for the use of smaller particles and prevent the bypassing of spouting fluid into the annular region, a draft tube was developed that can be placed centrally at a small distance above the inlet orifice. Thus, all of the gas travels directly from the top of the fountain to the annular region via the draft tube. It is observed that the draft tube enhances the maximum spoutable bed height and radial influx, and radically reduces: the intermixing of annular and spout solids, the particle circulation rates, the pressure drop and residence time distribution. Due to its unique and advantageous features, introducing a draft tube has become one of the significant modifications to conventional spouted beds.

Figure 2:
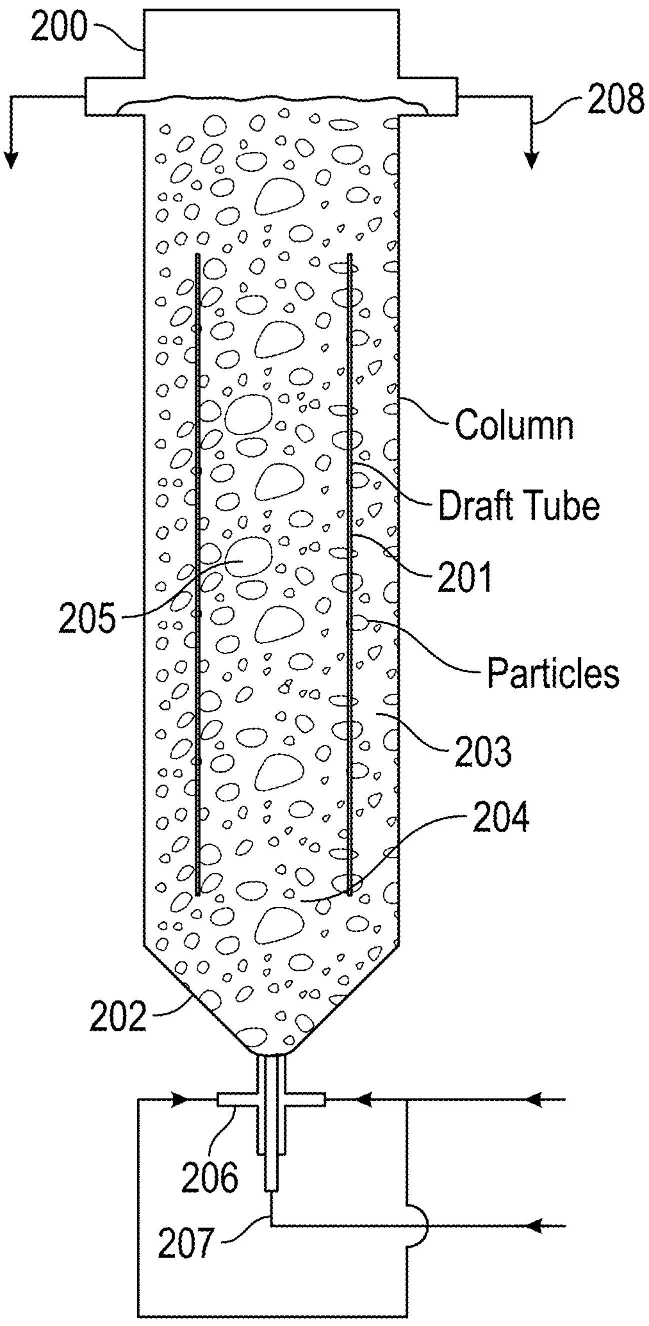
FIG. 2 is a schematic diagram of a cone-based spouted fluidized bed according to a preferred embodiment of the present invention with draft tube.

FIG. 2 shows a gas-liquid-solid or three-phase spouted bed [200] with a draft tube [201]. Traditional gas-liquid-solid cylindrical spouted beds use flat bases which usually require high flow rates; however, a spouted bed with a diverging conical base [202] allows for larger, coarser and less uniform spouting media, under a wide range of operating parameters, from those of a typical spouted bed to those of a dilute spouted bed. Then more effective gas-solid contact is attained to eliminate dead spaces at the bottom of the vessel while maintaining the bed stability.

According to a preferred embodiment of the present invention, the use of a three-phase spouted bed reactor [200] with a draft tube [201], and with solid particles [203], for $CO_2$ desorption in a solvent regeneration process in $CO_2$ capture aims to improve the activity of the solid particles [203]. Preferably, there is also an increase in the heat transfer and more preferably, in the mass transfer as well. This configuration also provides greater economic benefit and lower operating complexity, as compared to using solid particles in packed columns. The solid particles [203] may be any solid that can improve the solvent desorption kinetics, including solid acid catalysts and nanoparticles. The liquid [204] can be any chemical solvent that is suitable for a conventional PCCC process, such as aqueous amine solvents, ionic liquids, ionic liquids with water or amines, non-aqueous amine solvents and others. The liquid [204] is introduced into at least one liquid inlet [206] at the base of the spouted bed reactor [200]. The spouting gas [205] is the hot vapor that is created by heating the solvent in a reboiler and introducing it into a nozzle [207] at the base of the spouted bed reactor [200]. After a residence time in the spouted bed reactor [200], a portion of the treated liquid is discharged from at least one liquid outlet [208] near the top of the spouted bed reactor [200].

Figure 3:
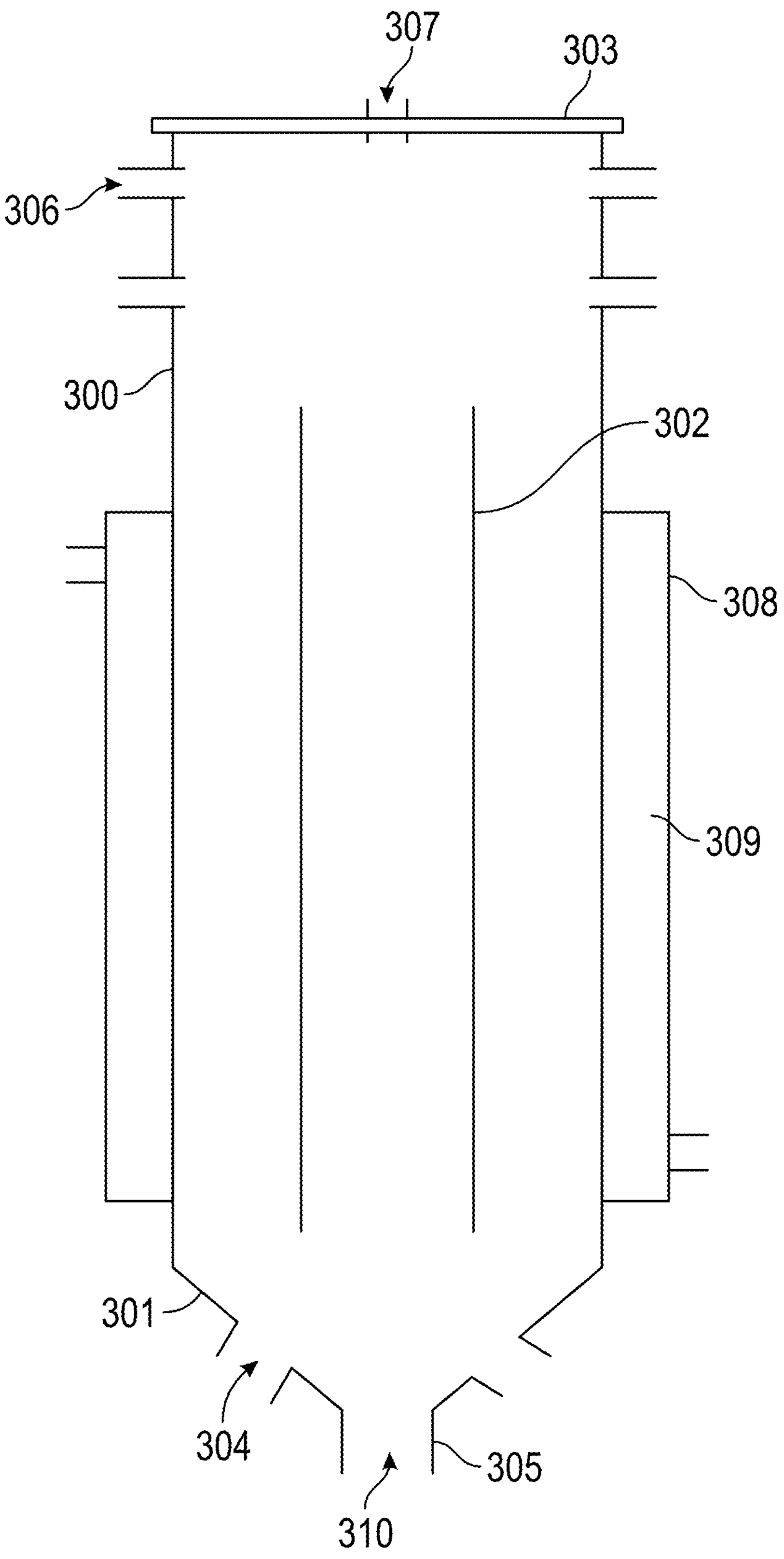
FIG. 3 is a schematic drawing of a cone-based spouted fluidized bed according to a preferred embodiment of the present invention, with draft tube and heating element surrounding at least a portion of the reactor body, for use in carbon capture and gas processing applications.

As illustrated by FIG. 3, according to a preferred embodiment of the present invention, the components of an SBJ reactor generally comprise a cylindrical vessel [300], a sloped cone bottom [301], a stainless-steel draft tube [302] and a detachable stainless-steel top [303]. It is configured as a reactor to contact the solid particles with a jet of fluid (hot vapor steam and/or heated $CO_2$-lean solvent). Preferably, there is at least one liquid inlet [304] and one interchangeable slotted nozzle [305] for the steam/vapor inlet [310] installed below the cone, and at least one liquid outlet [306] and one exhaust steam/vapor port on the top of the reactor [307], respectively.

Preferably, a heating element [308] may be used to wrap the SBJ reactor vessel [300]. It can be considered as either an insulating layer or heating layer, which in either case increases the heat transfer performance of the SBJ reactor. The heating medium [309] may be any waste heat source from the industrial facilities such as steam and hot water. Typically, the temperature of the heating medium [309] should between 100 to 140° C. depending on the actual demand. An overheated heating medium [309] may cause a serious amine degradation issue. The use of a heating element [308] is an optional embodiment of the process; it is an alternative option for enhancing heat transfer and mass transfer behavior.

Figure 4A:
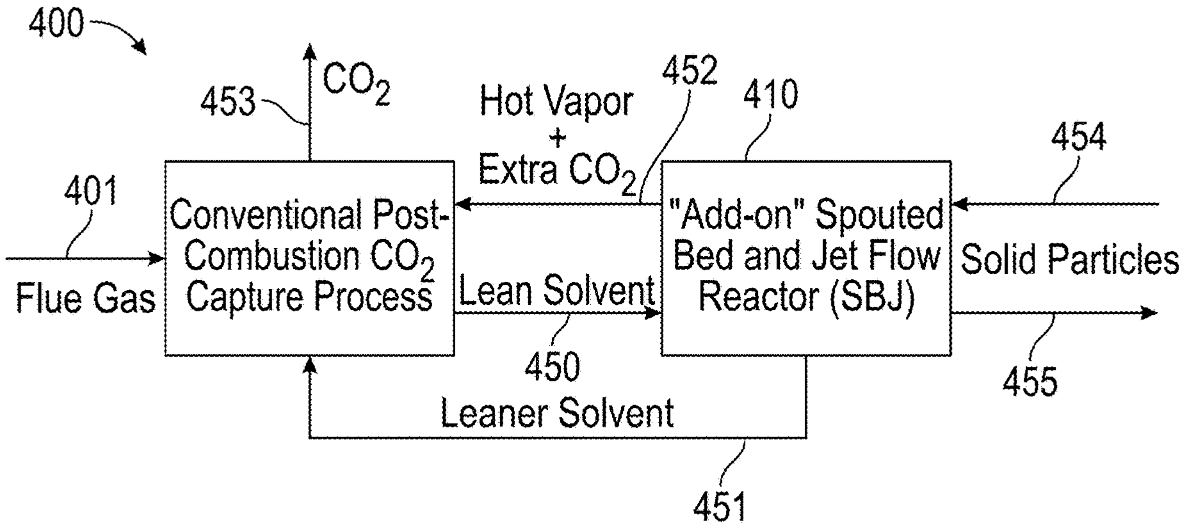
FIG. 4A is a simplified process diagram illustrating a method for using a three-phase spouted bed and jet flow reactor as an "add-on" unit for a conventional PCCC process according to a preferred embodiment of the present invention.

The process flowchart for a three-phase SBJ process according to a preferred embodiment of the present invention is illustrated by FIG. 4A. The conventional PCCC process [400] is the traditional process shown in FIG. 1. A three-phase SBJ process [410] may be integrated into the conventional PCCC process [400] to become a novel integrated process. Also, a three-phase SBJ process [410] and the conventional PCCC process [400] can work separately, meaning that the three-phase SBJ process [410] can receive the lean solvent [450] output from the conventional PCCC process [400], and then send the leaner solvent (treated solvent) [451] output from the three-phase SBJ process [410] back to the conventional PCCC process [400]. The three-phase SBJ process [410] will also generate hot vapor and extra $CO_2$ [452], which will be sent back to the conventional PCCC process [400], where said extra $CO_2$, together with the $CO_2$ generated by the conventional PCCC process [400], will be discharged as a combined $CO_2$ stream [453]. New solid particles [454] may be added to, and spent solid particles [455] may be removed from, the three-phase SBJ process [410]. The process, according to a preferred embodiment of the present invention, as described herein can be used at new CCS facilities or as a retrofit option for existing CCS facilities.

Figure 5:
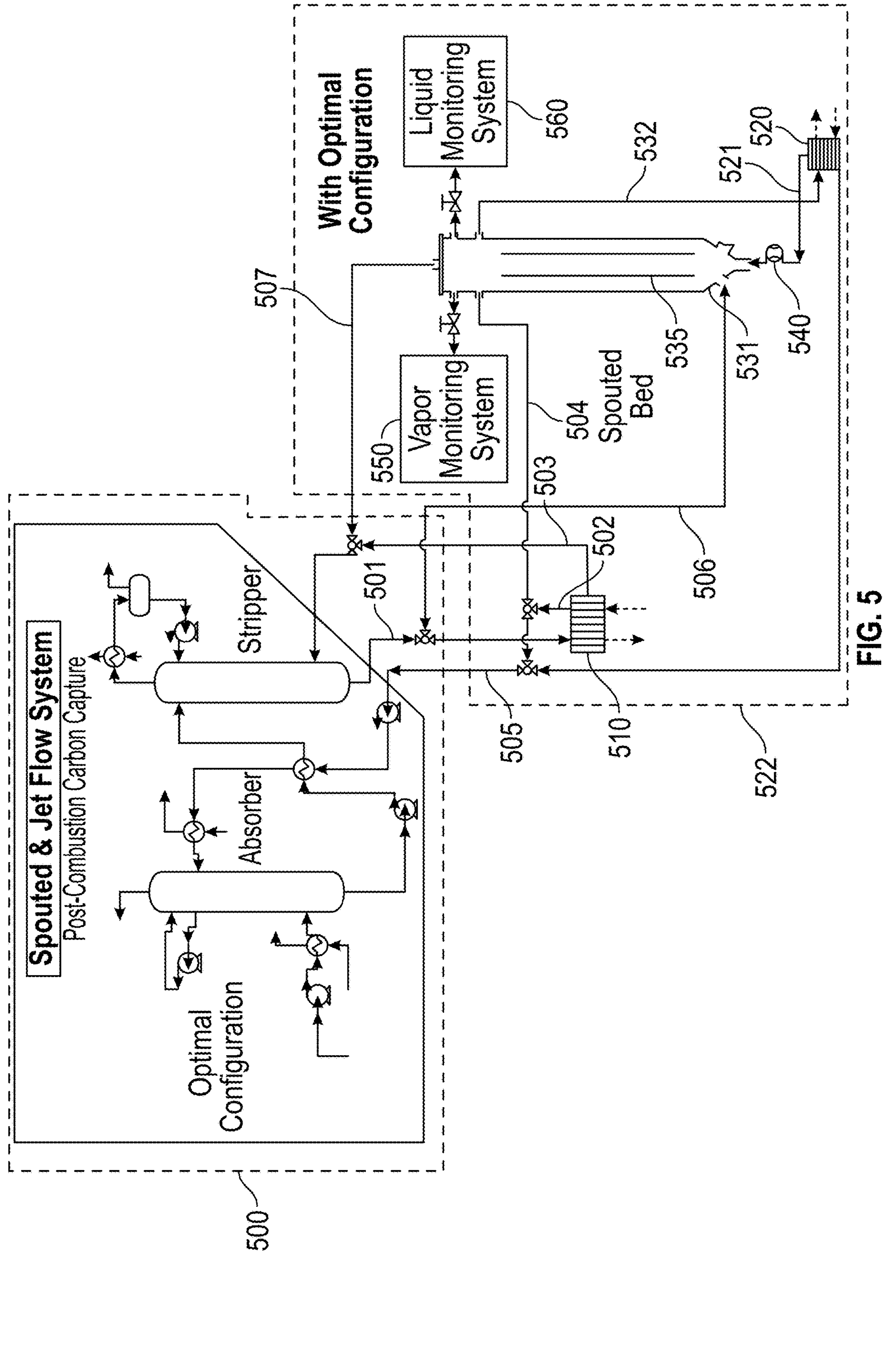
FIG. 5 is a schematic drawing illustrating a spouted bed and jet flow process for carbon capture and gas processing applications according to a preferred embodiment of the present invention.

FIG. 5 shows a PCCC process [500] with an SBJ process (using a SBJ reactor [530] comprising a draft tube [535] for improving $CO_2$ loads) as a sub-system of the solvent regeneration system for that process. The SBJ process includes a first reboiler [510], which heats a first stream [505] of the original lean solvent [501] output from the stripper column of the PCCC process [500] and outputs heated lean solvent in a first stream [502], which is sent back to the absorber column in the PCCC process [500], and a second stream [503], which is sent back to the stripper column in the PCCC process [500]. A second stream [506] of the original lean solvent [501] output from the stripper column of the PCCC process [500] is sent to a liquid inlet [531] at the base of the SBJ reactor [530]. The SBJ process also includes a second reboiler [520] which heats the hot lean solvent in a first stream [502] output from the SBJ reactor [530] into hot vapor, which hot vapor is output in a first stream [521], which is sent through a flow meter with calibrator [540] into the base of the SBJ reactor [530], and a second stream [522], which is sent back to the absorber column in the PCCC process [500]. A second stream of hot lean solvent [504] output from the SBJ reactor [530] is sent back to the absorber column in the PCCC process [500]. Hot vapor [507] output from the top of the SBJ reactor [530] is sent back to the stripper column in the PCCC process [500]. A vapor monitoring system [550] and liquid monitoring system [560] can control, detect, and evaluate the real-time temperature, pressure, gas and liquid flow rates, and $CO_2$ concentration in the steam/vapor and liquid steams, respectively, in the SBJ reactor [530].

During the spouting process, the solid particles are placed into the conical base of a three-phase SBJ reactor vessel with a pre-determined bed height, while the $CO_2$ lean solvent (0.2-0.4 mole $CO_2$/mol amine) and hot vapor steam, as spouting fluids, are injected via the liquid inlet and the vapor nozzle, respectively. The incoming fluids form a jet which entrains parts of solid catalysts that move through the draft tube. The rising bubbles carry catalysts from the bottom to top of bed and fall through the surrounding annular region. Then, spouting can be visually observed by virtue of the rapidly reversing motion of solid particles in the fountain and the relatively slow particle descent at the wall.

A two-phase spouted bed is a gas-liquid contactor in which lean solvent vapour, which has been heated in a reboiler, is introduced vertically as an auxiliary fluid preferably through a centrally located single orifice at a cylindrical or conical vessel distributor. The incoming hot vapour forms a jet which entrains and heats the injected liquids to create the conditions for turbulent flow and a central spout zone, a fountain beyond the peripheral bed level, and a surrounding annulus region. During the spouting process, there are several variables which come into play when optimizing the turbulent flow inside the spouted bed reactor including pressure drops, bubble penetration depth in the annulus region, inlet fluid temperature, gas holdup, fluid flow rate, and bubble size distribution. Some variables can be controlled using proper fittings. For instance, rising bubbles and jet flow rate can be controlled using different nozzles. The draft tube assists the jet flow straight upward to generate a preferred height of the fountain. The bubbles in the annulus region comprise gas $CO_2$, injected vapor, and vaporized liquid.

Figure 4B:
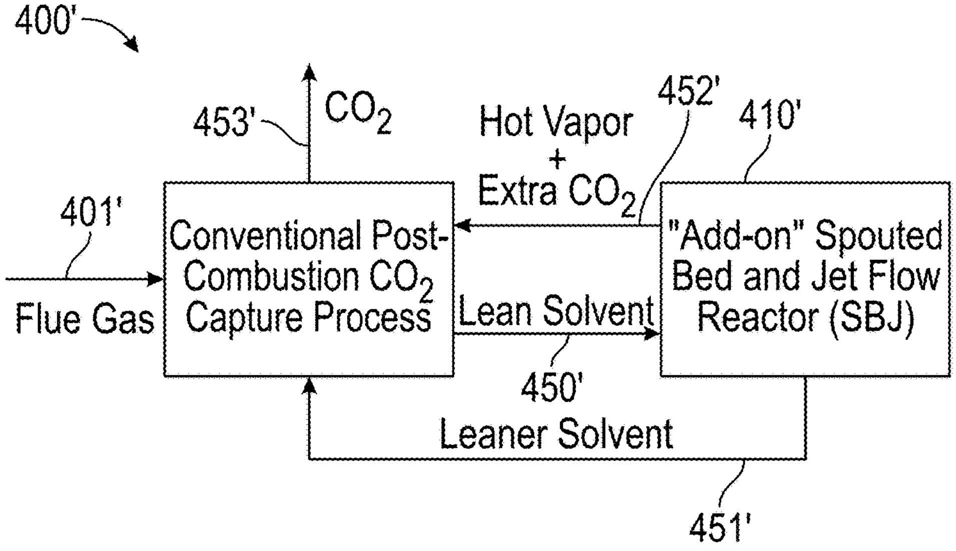
FIG. 4B is a simplified process diagram illustrating a method for using a two-phase spouted bed and jet flow reactor as an "add-on" unit for a conventional PCCC process according to a preferred embodiment of the present invention.

The process flowchart for a two-phase SBJ process according to a preferred embodiment of the present invention is illustrated by FIG. 4B. The conventional PCCC process [400'] is the traditional process shown in FIG. 1. A two-phase SBJ process [410'] may be integrated into the conventional PCCC process [400'] to become a novel integrated process. Also, a two-phase SBJ process [410'] and the conventional PCCC process [400'] can work separately, meaning that the two-phase SBJ process [410'] can receive the lean solvent [450'] from the conventional PCCC process [400'], and then send the leaner solvent (treated solvent) [451'] output from the two-phase SBJ process [410'] back to the conventional PCCC process [400']. The two-phase SBJ process [410'] will also generate hot vapor and extra $CO_2$ [452'], which will be sent back to the conventional PCCC process [400'], where said extra $CO_2$, together with the $CO_2$ generated by the conventional PCCC process [400'], will be discharged as a combined $CO_2$ stream [453']. The process, according to a preferred embodiment of the present invention, as described herein can be used at new CCS facilities or as a retrofit option for existing CCS facilities.

Preferably, the hot vapor stream released from the reboiler is injected into the bottom of the spouted bed reactor, as a direct steam injection process. In general, the direct heating process is a rapid heat transfer process, and accordingly, it may save more heat energy as compared to other indirect heat transfer processes using other types of heat exchanger. The lean solvent can gradually become leaner solvent by absorbing the heat from the hot vapor, which causes more $CO_2$ desorption from the solvent. The released hot vapor from the top of the SBJ reactor contains mainly $H_2O$ and $CO_2$, each of which may then be introduced into the conventional thermal stripper to reduce the reboiler heat.

Compared to other types of fluid beds, spouted beds require less vapor velocity if the shape and the geometry of the column is within certain parameters. Lower vapor velocity brings several benefits, including: (i) less energy required to generate the vapor or steam; (ii) the lean solvent will contain higher moisture and lower viscosity; and (iii) the process is easier to control and operate. As shown in Table 1, the configuration of the SBJ process can separate more $CO_2$, which helps the lean loading to achieve equilibrium faster. Since the SBJ process also releases hot vapor, it can further reduce the reboiler heat required for the conventional solvent stripper. In an integrated process, the cyclic capacity can be significantly improved with the lower thermal heat requirement. Consequently, according to a preferred embodiment of the present invention, operators can save more operating costs on the solvent and the energy used in the process. The effect on the efficiency of a three-phase SBJ system also depends on the characteristics of the solid particles. In general, the mass ratio or the volume ratio of the solvent and solid particles are dependent on the thermal load of the conventional process, the type of solvent, and characteristics of the solid particles. For instance, the shape of the solid catalyst and the material of the solid catalyst can both affect increases in the efficiency of the system.

TABLE 1

| Shows the design parameters used in solvent regeneration units in PCCC processes | |
|---|---|
| **Lean solvent from a conventional desorption/regeneration unit** | |
| Lean loading, mol/mol | 0.2-0.4 |
| Temperature, ° C. | 90-110 |
| Split ratio | 0-50% |
| **Lean solvent reboiler** | |
| Temperature (liquid solvent outlet), ° C. | 110-125 |
| Temperature (hot vapor), ° C. | 110-125 |
| **Spouted bed reactor** | |
| $CO_2$ loading for leaner solvent outlet, mol/mol | 0.3-0.15 |
| Temperature (hot vapor), ° C. | 110-135 |
| Pressure drop | dependent on the liquid holdup |
| **Leaner solvent reboiler** | |
| Temperature (liquid solvent outlet), ° C. | 110-135 |
| Temperature (hot vapor), ° C. | 110-135 |

Experimental Results

A stirred tank was built as a bench-scale reactor to mimic the spouted column in advance and to study how turbulent flow can significantly improve solvent regeneration performance. The benchmark 5M MEA solution and solid acid catalysts (HZSM-5), for experiments mimicking a three-phase SBJ reactor, were used to strip $CO_2$ at three constant stirring speeds of 0 rpm, 500 rpm and 1000 rpm under two different regeneration temperatures of 363 K (90° C.) and 368 K (95° C.), respectively.

MEA (purity≥98%), AMP (purity≥98%) and PZ (purity≥98%) were obtained from Sigma Canada, and cylindrical shaped HZSM-5 catalysts from ACS Material. 8 vol. % $CO_2$ with N2 balanced gas cylinder was purchased from Praxair Inc., Canada. 1N hydrochloric acid (HCl, Fisher Chemical, USA) was used for titration with methyl orange as an indicator to confirm the concentration of amine solution. Silicone oil (Clearco Products CO., Inc, USA) was utilized as the heating bath fluid.

Figure 6:
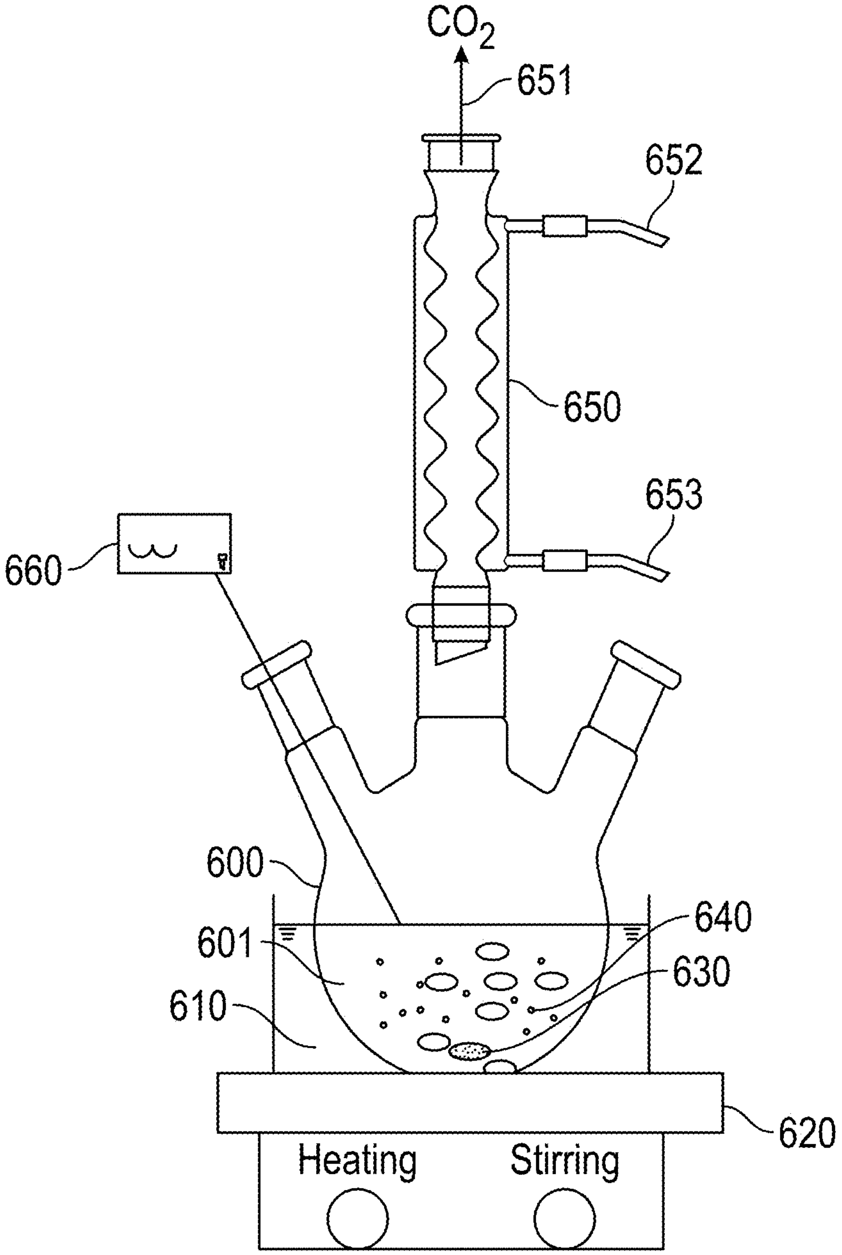
FIG. 6 illustrates a bench-scale stirring experimental set-up used to measure the non-catalytic and catalytic $CO_2$ desorption rate of the solvent under different temperature conditions and with various levels of turbulent flow.

A schematic diagram of the experimental set-up for solvent regeneration is shown in FIG. 6. Each rich MEA solution [601] was prepared to the concentration of 5M by dissolving its predetermined mass with deionized water. The dry feed gas (8 vol. % $CO_2$ with N2 balanced) was introduced to the water saturator in advance, then was sent into the MEA solution [601] to load the amine solution. The actual $CO_2$ loading was set at 0.3-0.42 mol $CO_2$/mol amine at the start for all the solutions, and the values can be measured by titration with 1N HCl using methyl orange as an indicator. Two sets of 30 mL of 5M MEA were placed in two 50 mL of round bottom angled 3-neck reaction flasks [600] and warmed up to the operating temperatures of 363 K and 368 K respectively in the controlled temperature oil bath [610] with heating plates [620]. A magnetic stir bar [630] at 0 rpm stirring speed was placed at the bottom of each flask and used for stirring the mixture. For experiments mimicking a three-phase SBJ reactor, exactly 2 g of HZSM-5 catalysts [640] of 3-5 mm particle size were placed in the amine solutions respectively. One neck of each flask was connected to a condenser [650], having a cooling water inlet [652] and a cooling water outlet [653], to prevent amine/water from being lost by vaporization and feed-gas carry-over. $CO_2$ [651] stripped from the amine solvent is released from the top of the condenser [650]. A thermometer [660] in an adaptor was inserted on the top of another neck of each flask to monitor the temperature. The Chittick apparatus was used for determining the $CO_2$ loadings based on AOAC methods. Samples were taken out of each flask twice per time by pipetting 1 mL at periods of 10, 20, 30, 40, 50 and 60 min, and the average was recorded as the final $CO_2$ loading. The % AAD and the initial desorption rate at 30 minutes ($I_{des\_rate}$, $^{molCO_2/L\ min}$) can be calculated from Eqs. (1) and (2), respectively.

$$\%\ AAD = \frac{1}{N}\sum_{i=1}^{N}\left|\frac{\alpha^{n}_{CO_2} - \alpha^{i}_{CO_2}}{\alpha^{n}_{CO_2}}\right| \quad (1)$$

$$I_{des\_rate} = \frac{CV}{V}\frac{d\alpha}{dt} = C\frac{d\alpha}{dt} \quad (2)$$

where N is the number of data;

$$\alpha^{n}_{CO_2}$$

, $$\alpha^{i}_{CO_2}$$

are the $CO_2$ loadings from these experiments; C is the concentration of amine solution (M); and V is the volume of solution (30 mL); dα/dt is the slope of desorption profile.

Besides 0 rpm stirring speed, experiments at 500 rpm and 1000 rpm under the operating temperatures of 363 K and 368 K were also carried out, respectively. Every experiment was conducted at atmospheric pressure and repeated twice to ensure the accuracy and reliability of the measurement.

Results and Discussion

Figure 7A:
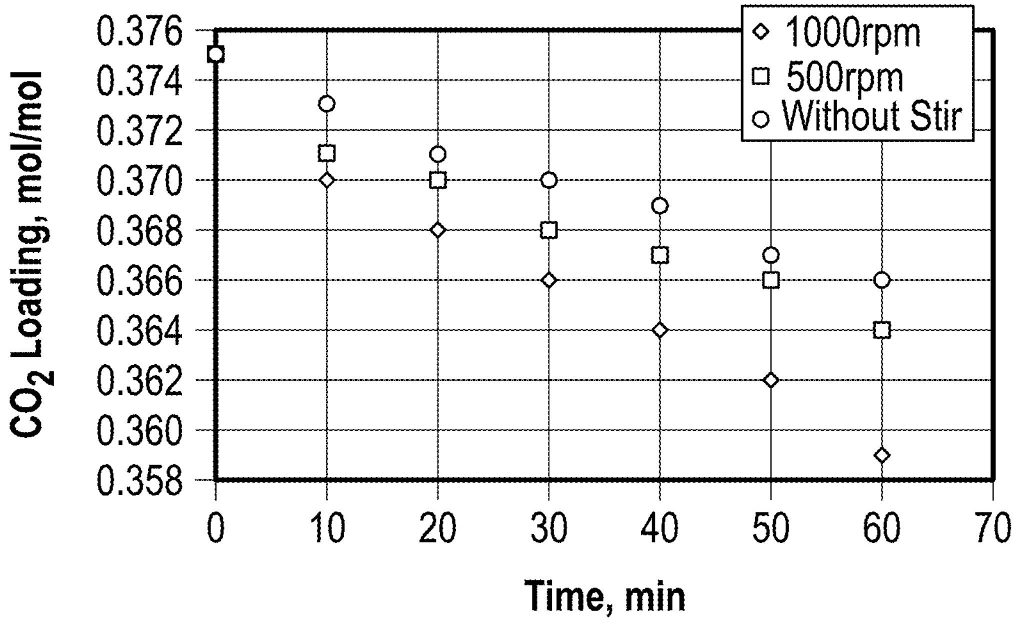
FIG. 7A is a graphical representation of the $CO_2$ loading of a solvent vs. time at 363 K without a catalyst, produced by an experiment performed by the inventors using the set-up shown in FIG. 6.

FIG. 7A shows the effects of stirring speeds on $CO_2$ loadings without catalyst at 363K. As shown in this figure, more $CO_2$ gas can be stripped out of the rich amine solution with an increase in the stirring speed. Increasing the stirring speed increased the centrifugal acceleration and caused the formation of turbulent flow. Turbulent flow significantly promoted bubble-breaking effects and hydrodynamic effects that resulted in an increase in the contact area in the reactor and increase in the $CO_2$ mass transfer from the liquid phase to the vapor phase. Additionally, the heat transfer coefficient increased with elevated stirring speeds.

Figure 7B:
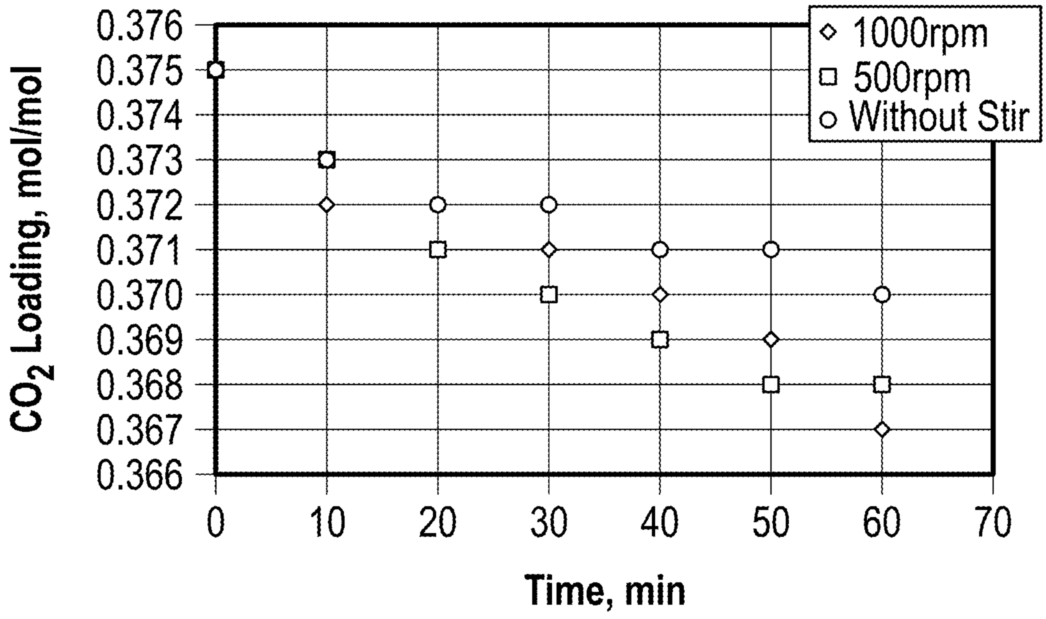
FIG. 7B is a graphical representation of the $CO_2$ loading of a solvent vs. time at 363 K with a catalyst, produced by an experiment performed by the inventors using the set-up shown in FIG. 6.
Figure 8A:
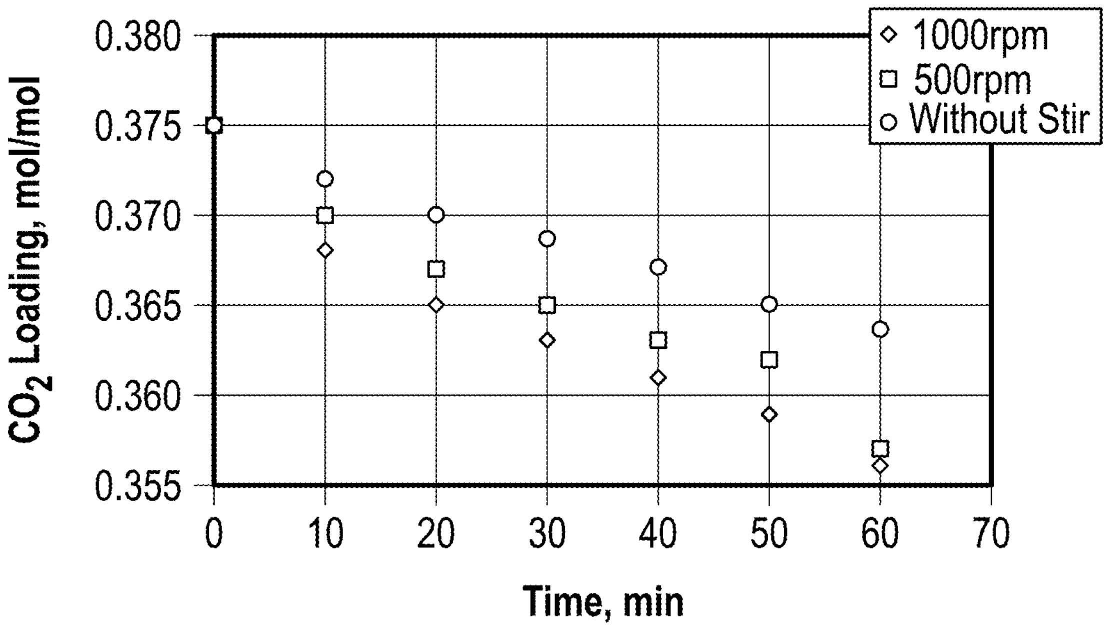
FIG. 8A is a graphical representation of the $CO_2$ loading of 5M MEA solvent vs. time at 368 K without a catalyst, produced by an experiment performed by the inventors using the set-up shown in FIG. 6.
Figure 8B:
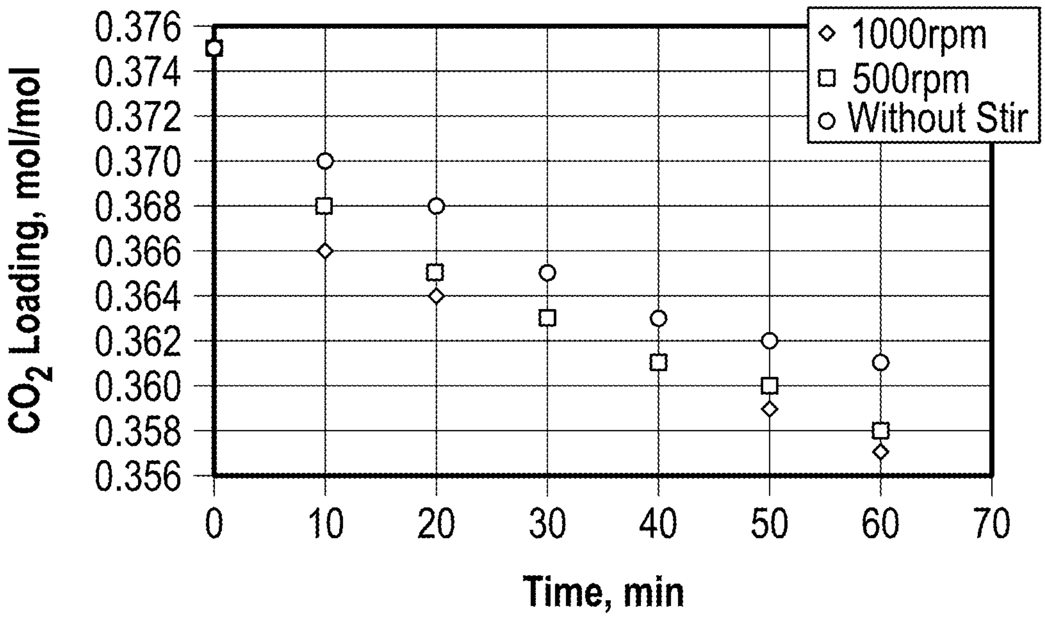
FIG. 8B is a graphical representation of the $CO_2$ loading of 5M MEA solvent vs. time at 368 K with a catalyst, produced by an experiment performed by the inventors using the set-up shown in FIG. 6.
Figure 9A:
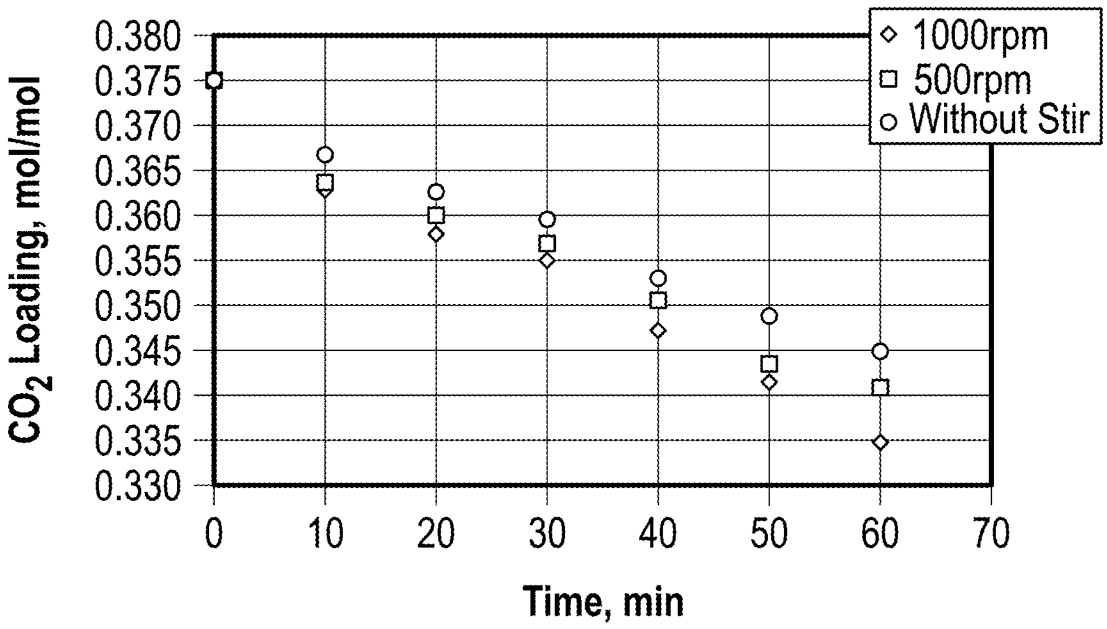
FIG. 9A is a graphical representation of the $CO_2$ loading of 3M MEA+2M AMP solvent vs. time at 368 K without a catalyst, produced by an experiment performed by the inventors using the set-up shown in FIG. 6.
Figure 9B:
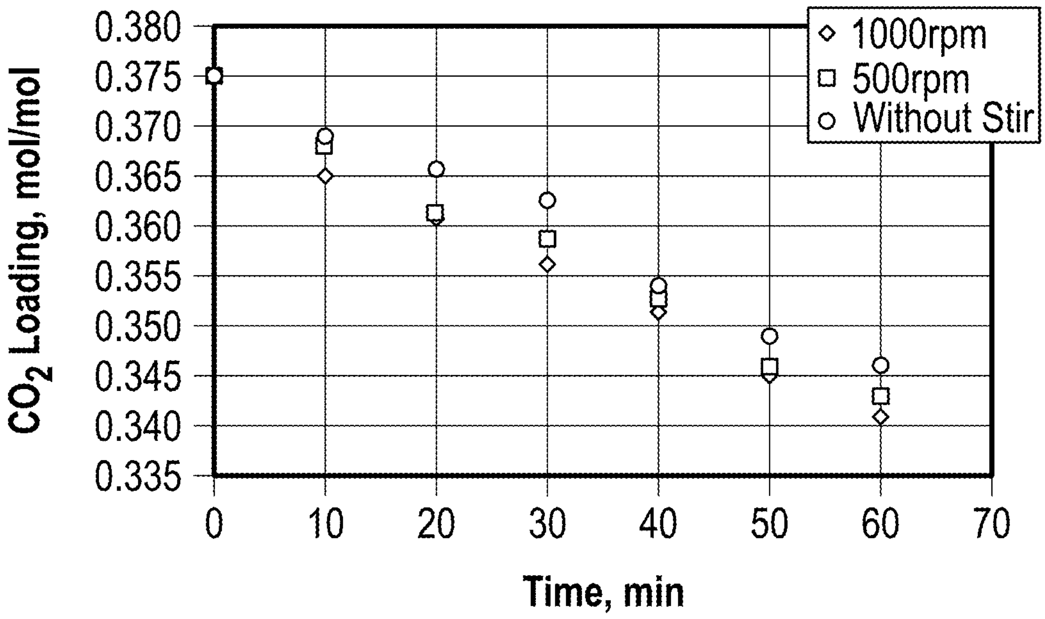
FIG. 9B is a graphical representation of the $CO_2$ loading of 3M MEA+2M AMP solvent vs. time at 368 K with a catalyst, produced by an experiment performed by the inventors using the set-up shown in FIG. 6.

The effects of using turbulent flow are more significant when using a catalytic-desorption process than without a catalyst. The tendency shown in FIG. 7B, with HZSM-5, catalysts was similar to that of FIG. 7A at the same operating temperature. However, at 0 rpm stirring speed, the desorption performance with catalysts was nearly the same as without a catalyst. In contrast to the experiments without stirring, it can be clearly observed that the addition of HZSM-5 into the rich amine solution is able to accelerate the desorption rate and reduce the energy requirement of $CO_2$ stripping when an elevated stirring speed, compared to the rich amine solution without catalysts. When the stirring speed was further increased to 1000 rpm, the resulting large turbulent flow could potentially prevent the accumulation and settling of solid catalyst. The efficient contact area between catalyst and solvent is thus increased.

FIGS. 8A and 8B and FIGS. 9A and 9B show the effect of increasing the rich amine temperature to 368 K on the amount of $CO_2$ desorbed from the solvent. It is known that higher operating temperatures can improve the stripper performance. The highest stirring speed (1000 rpm) also shows a steeper decline of the amine solvent's $CO_2$ loading, which means higher rich amine temperature with higher stirring speed could improve the solvent regeneration more significantly. However, maintaining a higher operating temperature requires more energy input. As a result, the optimal operating parameters are those that attain low energy consumption but still maintain a reasonable regeneration efficiency. This is one of the major benefits of the proposed invention-direct hot vapor injection (from the vapor outlet of the SBJ reactor) reduces energy consumption due to the direct heat transfer process. In addition, the hot vapor was introduced into the SBJ reactor column through a central nozzle, which nozzle may be adjusted to optimize the overall performance of the process based on several factors, including: the characteristics and properties of the solid particles, vapor flow rate, liquid properties, and liquid/solid hold up. The size of the bubbles and the spray pattern are decided by the selection of the central nozzle. Rising bubbles should be able to push the solid particles into the draft tube and to flow upward. The draft tube thus promotes bulk circulation of liquid, solid and gas between the inner draft tube zone and annulus zone.

Figure 10A:
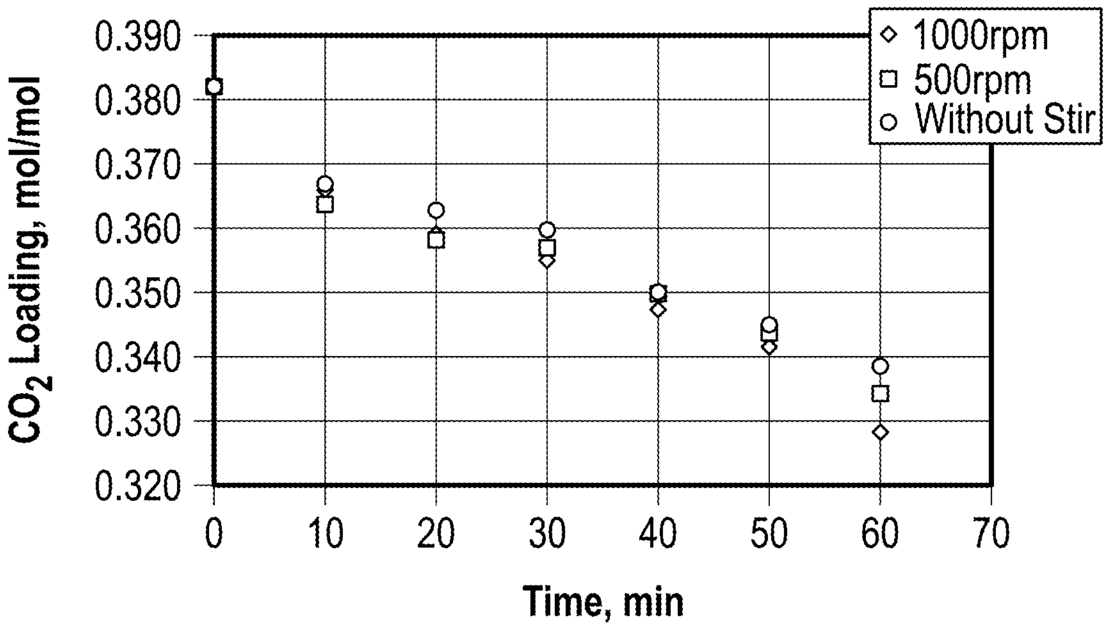
FIG. 10A is a graphical representation of the $CO_2$ loading of 3M MEA+2M PZ solvent vs. time at 368 K without a catalyst, produced by an experiment performed by the inventors using the set-up shown in FIG. 6.
Figure 10B:
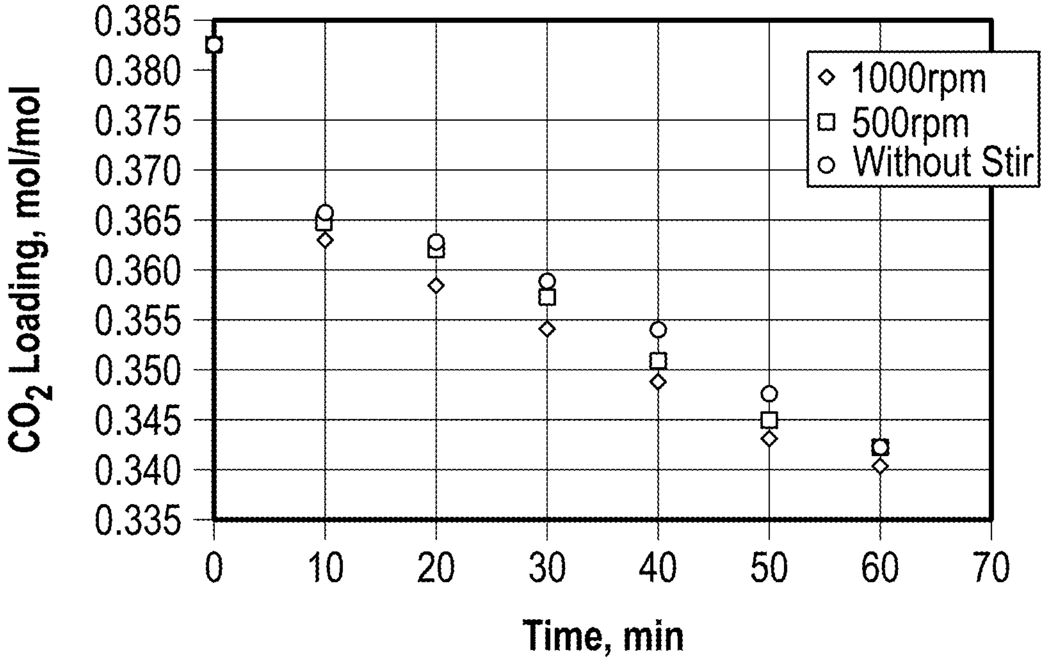
FIG. 10B is a graphical representation of the $CO_2$ loading of 3M MEA+2M PZ solvent vs. time at 368 K with a catalyst, produced by an experiment performed by the inventors using the set-up shown in FIG. 6.

The above experimental results of 5M MEA establish that turbulent flow seems to play a key role to improve the $CO_2$ desorption performance of an SBJ reactor system. Adding a catalyst in a turbulent flow system enhances the desorption behavior of the system. The desorption heat of MEA is high. Hence, blending an amine solvent with lower desorption heat into MEA is advantageous. The above experimental results investigated the effect of turbulent flow on two typical blended solvents 3M MEA+2M AMP and 3M MEA+2M PZ at 368 K. Similar to the observation from 5M MEA results, stirring speed plays an essential role for two blended solvents as well. However, the enhancement of turbulent flow on the desorption performance of 3M MEA+2M PZ is lower than other solvents as shown in FIGS. 10A and 10B. This result was likely caused by higher viscosity of 3M MEA+2M PZ as compared to other solvents. In fact, liquid viscosity is an essential parameter affecting the Reynolds number, which directly reflects the fluid dynamics. In this case, the results also reflect other benefits of using a three-phase spouted bed column in a $CO_2$ desorption process. In particular, the solid particles can be moved in the viscous liquid phase by injecting the minimum volume of hot vapor compared to other types of fluidized bed reactor, which is an energy-saving approach. Additionally, the direct hot vapor injection can enhance the $CO_2$ separation from the liquid phase due to the direct heating process. Additional $CO_2$ bubbles will thus be generated from the liquid phase that can also promote the bulk circulatory motion of gas, liquid, and solids between the draft tube and annulus, which increases the overall close contact of particles across the three phases.

Figure 11A:
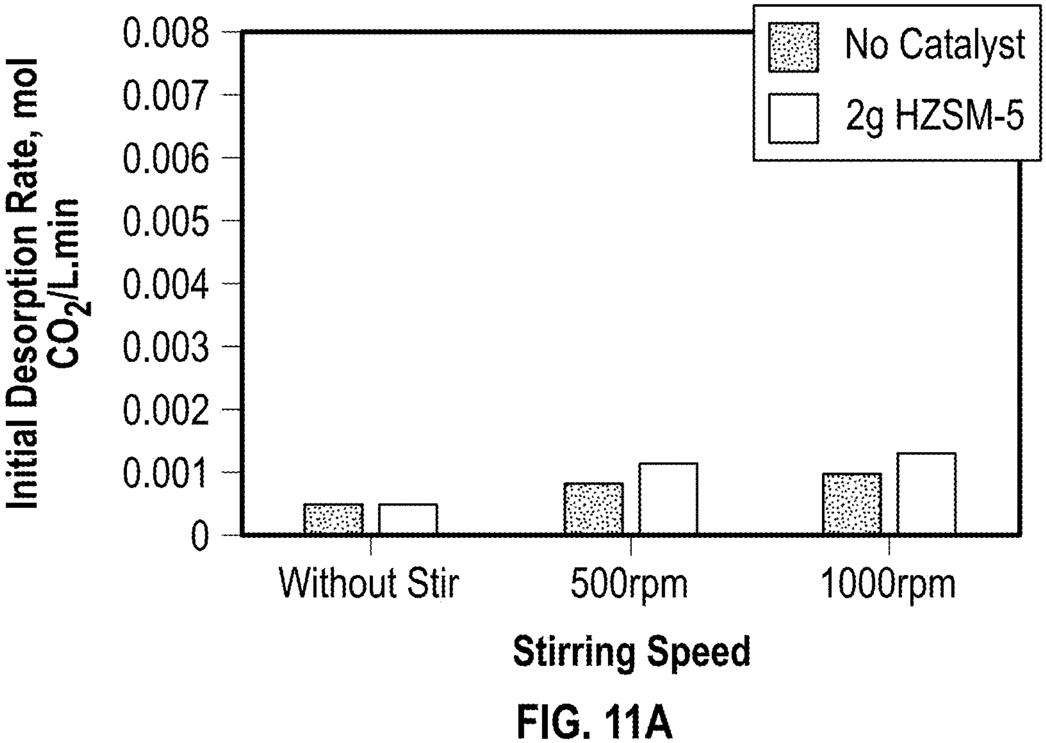
FIG. 11A is a graphical representation of the initial $CO_2$ desorption rate of 5M MEA solvent vs. stirring speed at 363 K, produced by an experiment performed by the inventors using the set-up shown in FIG. 6.
Figure 11B:
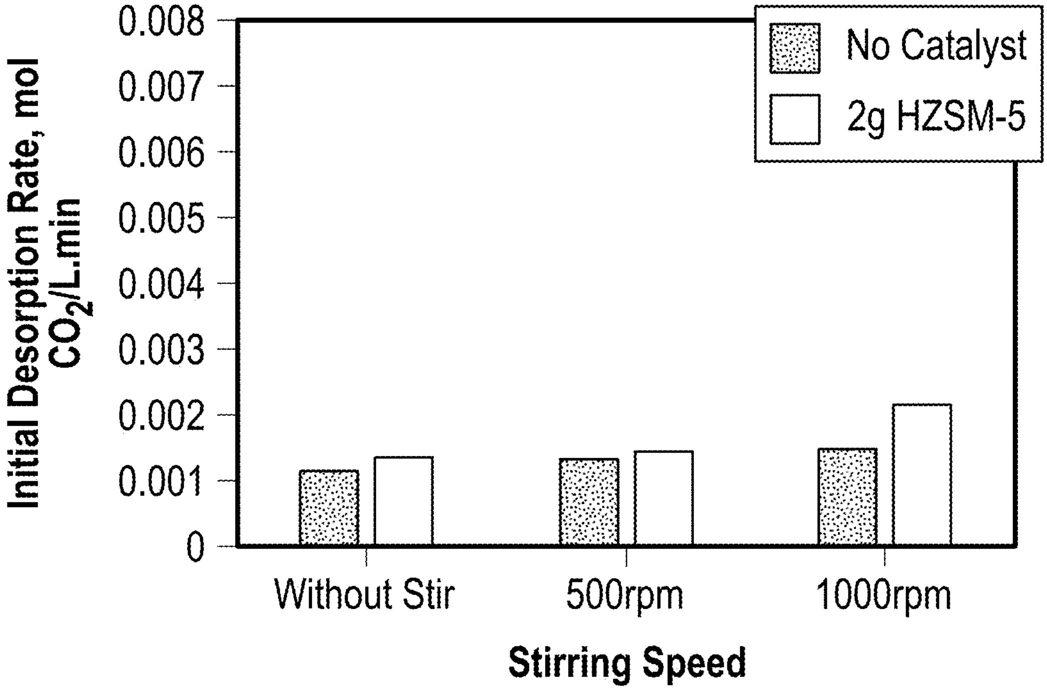
FIG. 11B is a graphical representation of the initial $CO_2$ desorption rate of 5M MEA solvent vs. stirring speed at 368 K, produced by an experiment performed by the inventors using the set-up shown in FIG. 6.
Figure 12A:
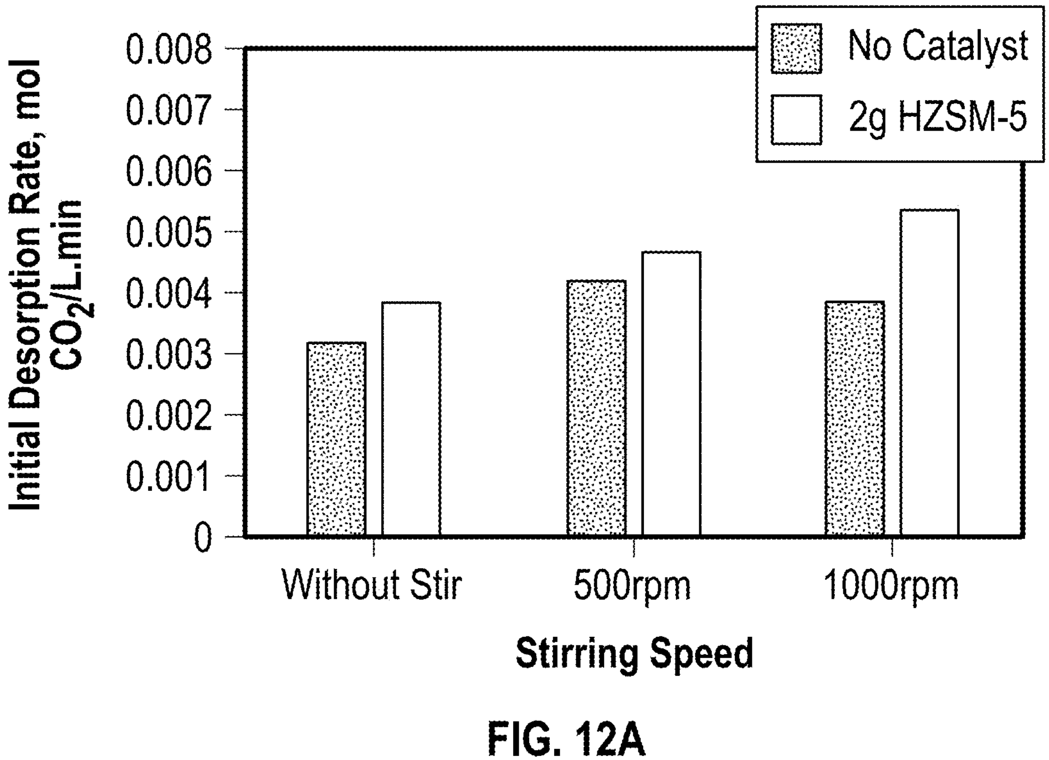
FIG. 12A is a graphical representation of the initial $CO_2$ desorption rate of 3M MEA+2M AMP solvent vs. stirring speed at 368 K, produced by an experiment performed by the inventors using the set-up shown in FIG. 6.
Figure 12B:
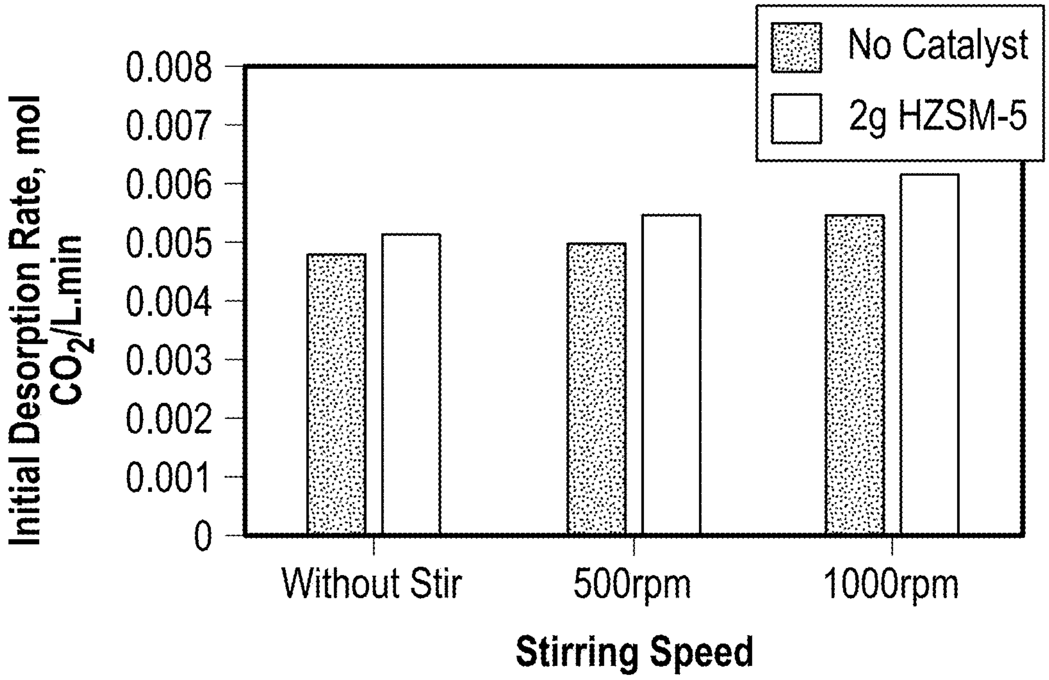
FIG. 12B is a graphical representation of the initial $CO_2$ desorption rate of 3M MEA+2M PZ solvent vs. stirring speed at 368 K, produced by an experiment performed by the inventors using the set-up shown in FIG. 6.

The effects of the stirring speed, the addition of catalysts and the operating temperature on the desorption behavior of 5M MEA in terms of the initial desorption rate (first 30 minutes) were also evaluated, as presented in FIGS. 11A and 11B, respectively. It can be seen that higher stirring speed and operating temperature, and the addition of catalysts can lead to an increase in the initial desorption rate. In FIG. 11A, although there was almost no enhancement of the initial desorption rate when using a catalyst at 0 rpm, the experimental data showed that initial desorption rates were promoted by 40% with a stirring speed of 500 rpm and by adding HZSM-5 catalysts at 363 K of operating temperature, respectively. A similar phenomenon was observed by increasing the operating temperature to 368 K in FIG. 11B. The initial desorption rates were significantly improved, by 45/a, with a stirring speed of 1000 rpm and by adding HZSM-5 catalysts. For the solvents with lower desorption heat, turbulent flow can also be a considerable factor as shown in FIGS. 12A and 12B.

The person skilled in the art will understand that the process according to the present invention is not intended to be limited to a particular type of catalyst. It is understood that types of catalysts, other than those which were tested, can be used according to a preferred embodiment of the present invention. If the solid catalyst has only minor influence on the desorption performance, further work may include the use of other catalysts or solid particles in order to enhance the circulatory motion and catalytic behavior. The person skilled in the art will understand based on the above that in the absence of solid particles in the system, the system is referred to as a two-phase internal loop spouted column (two-phase SBJ system).

Figure 13A:
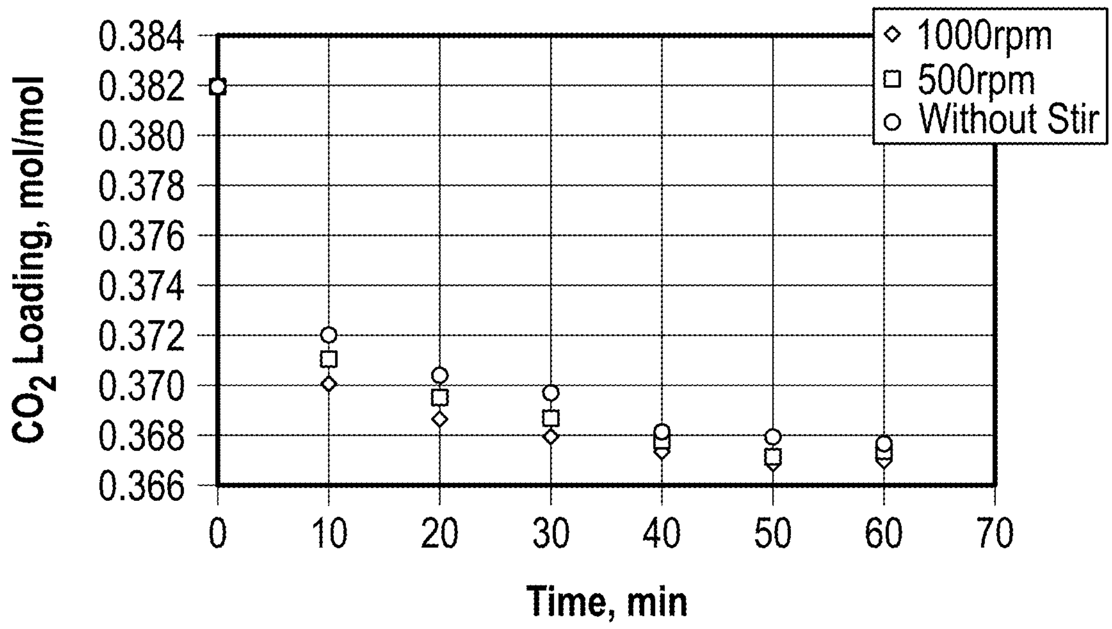
FIG. 13A is a graphical representation of $CO_2$ loading of 7.5M MEA solvent vs. time at 368 K without a catalyst, produced by an experiment performed by the inventors using the set-up shown in FIG. 6.
Figure 13B:
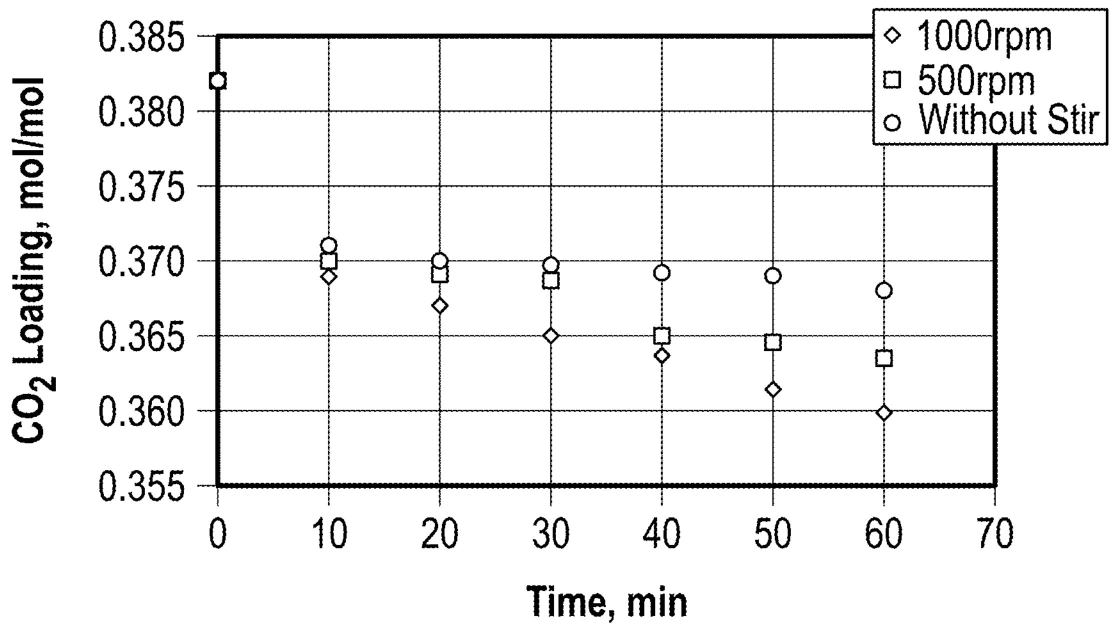
FIG. 13B is a graphical representation of $CO_2$ loading of 7.5M MEA solvent vs. time at 368 K with a catalyst, produced by an experiment performed by the inventors using the set-up shown in FIG. 6.
Figure 14A:
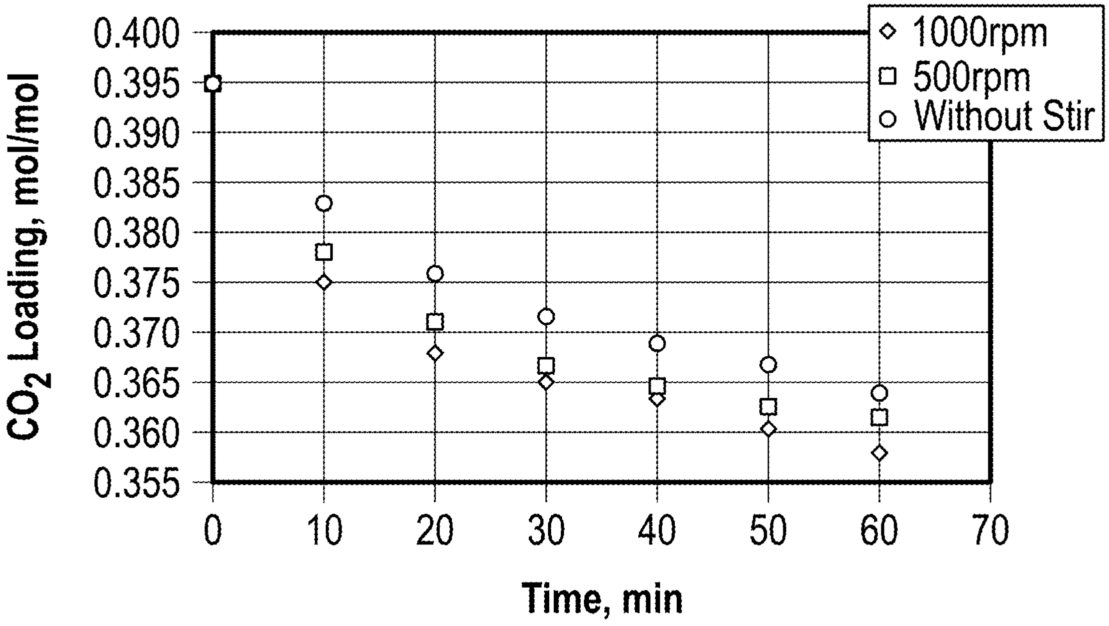
FIG. 14A is a graphical representation of $CO_2$ loading of 4.5M MEA+3M AMP solvent vs. time at 368 K without a catalyst, produced by an experiment performed by the inventors using the set-up shown in FIG. 6.
Figure 14B:
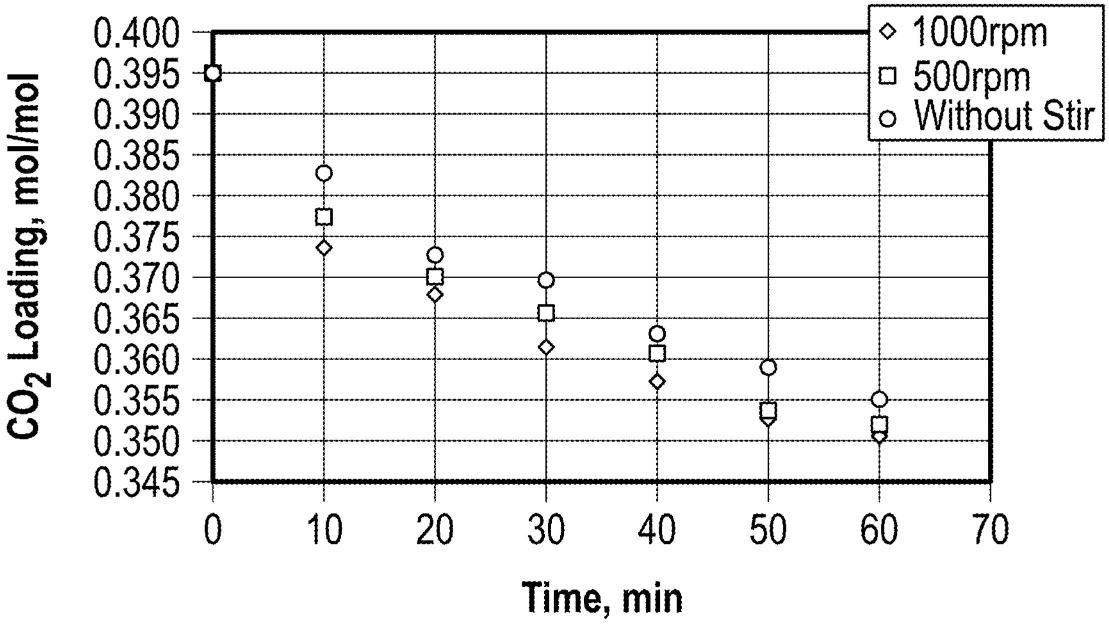
FIG. 14B is a graphical representation of $CO_2$ loading of 4.5M MEA+3M AMP solvent vs. time at 368 K with a catalyst, produced by an experiment performed by the inventors using the set-up shown in FIG. 6.
Figure 15A:
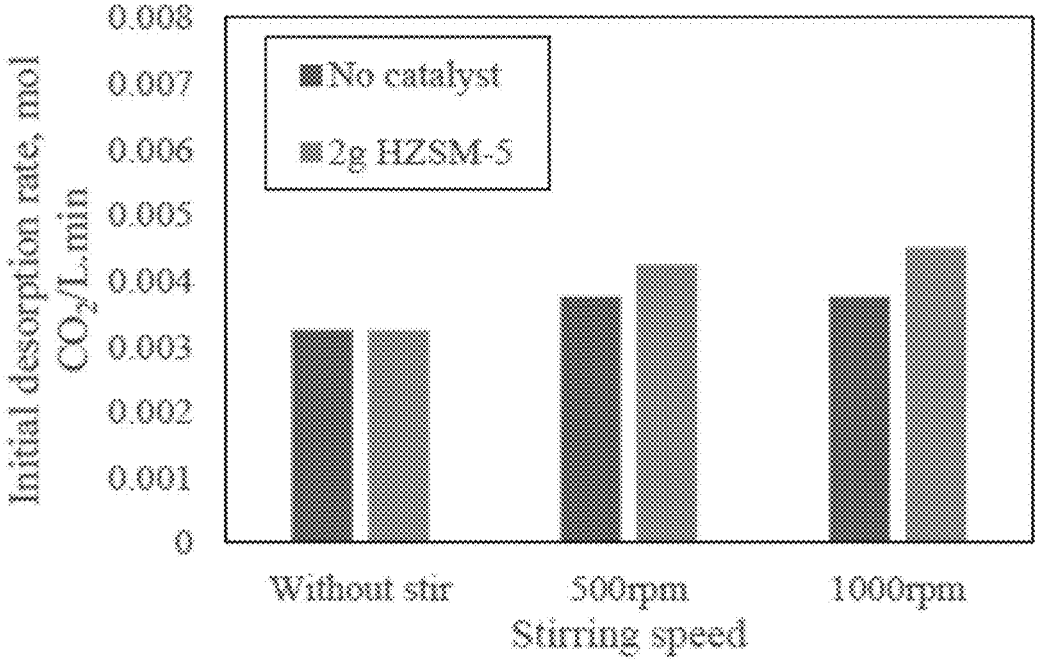
FIG. 15A is a graphical representation of the initial $CO_2$ desorption rate of 7.5M MEA solvent vs. stirring speed at 368 K, produced by an experiment performed by the inventors using the set-up shown in FIG. 6.
Figure 15B:
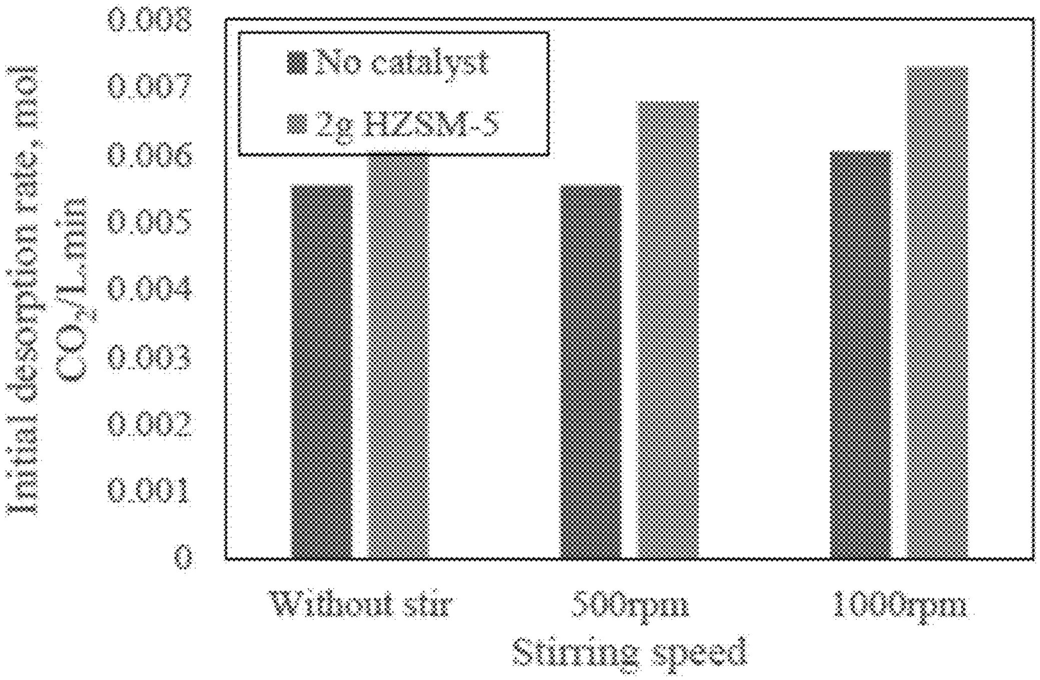
FIG. 15B is a graphical representation of the initial $CO_2$ desorption rate of 4.5M MEA+3M AMP solvent vs. stirring speed at 368 K, produced by an experiment performed by the inventors using the set-up shown in FIG. 6.

Turbulent flow with a catalyst exhibited excellent desorption performance in a concentrated amine-$CO_2$ system as shown in FIGS. 13A and 13B. For an MEA-$CO_2$ desorption system, the temperature of the hot vapor from the reboiler is normally around 120° C. or higher. The addition of an HZSM-5 catalyst is more beneficial for a low-temperature desorption process, likely due to its great mesoporous surface and higher number of acid sites. Consequently, the contact of carbamate and the active sites facilitate the $CO_2$ desorption rate. A similar trend was observed for concentrated MEA+AMP blends as shown in FIGS. 14A and 14B. FIGS. 15A and 15B confirmed that the initial desorption rates of 7.5M amine solvents are faster than 5M amine solvents, which is beneficial due to the lower reboiler heat consumption for such solvents. Also, compared to the lower concentration solvents, turbulent flow with a catalyst exhibited greater enhancement of initial desorption rate for the more concentrated amine solvents. More $CO_2$ bubbles will be generated during the further practical spouted bed operations, which is a favored behavior to improve the hydrodynamics performance of the system.

According to an aspect of the present invention, there is provided an SBJ process comprising the use of a conical spouted-fluid bed with draft tube as a solvent regenerator with leaner $CO_2$ loading and lower energy requirements, achieved through favourable multi-phase (vapor/liquid or vapour/liquid/solid) contacting and mass transfer rate in the liquid phase.

Figure 16:
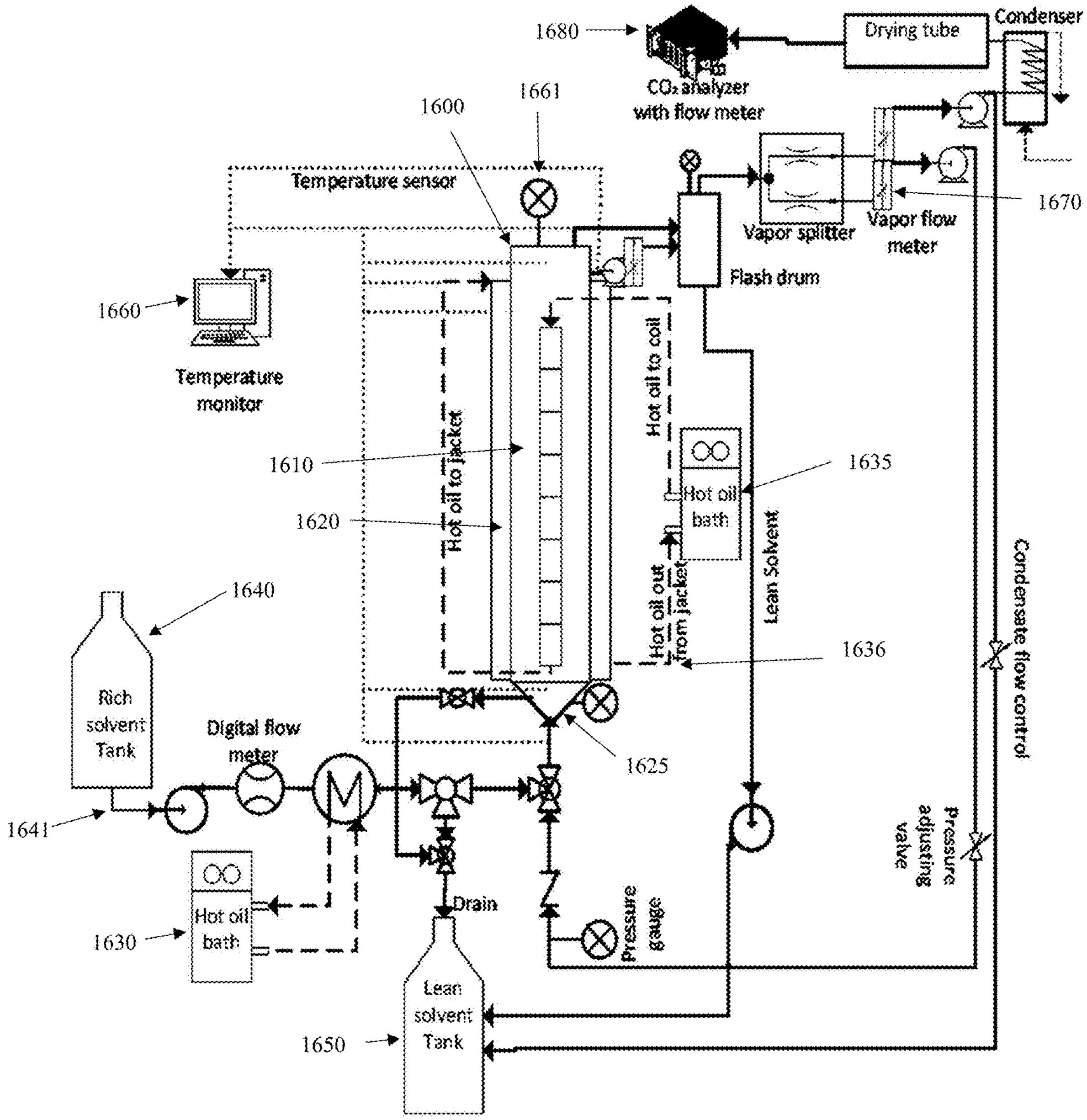
FIG. 16 is a schematic drawing of a bench-scale experimental set-up, with a draft tube comprising a heating coil and a heating element surrounding at least a portion of the reactor vessel, used to measure the heat transfer and $CO_2$ separation efficiency of the system under various operating conditions, including different levels of turbulent flow, temperatures and liquid flow rates.

FIG. 16 is a schematic drawing of a bench-scale experimental set-up, with the SBJ vessel similar to the SBJ vessel portion of the system illustrated in FIG. 5. The experimental set-up comprises: an SBJ reactor vessel [1600]; a draft tube comprising a heating coil [1610]; a heating element which surrounds at least a portion of the outside of the SBJ reactor vessel [1620]; a removable conical base [1625] with a removable nozzle; a first hot oil bath [1630] for heating the rich solvent [1641] from a rich solvent tank [1640]; a second hot oil bath [1635] for heating a heating medium [1636] to be applied to, or circulated through, the draft tube comprising a heating coil [1610] and the heating element outside of the SBJ reactor vessel [1620]; a lean solvent tank [1650]; a temperature monitor [1660], with temperature sensor [1661]; a vapor flow meter [1670]; and a $CO_2$ analyzer [1680].

Figure 17:
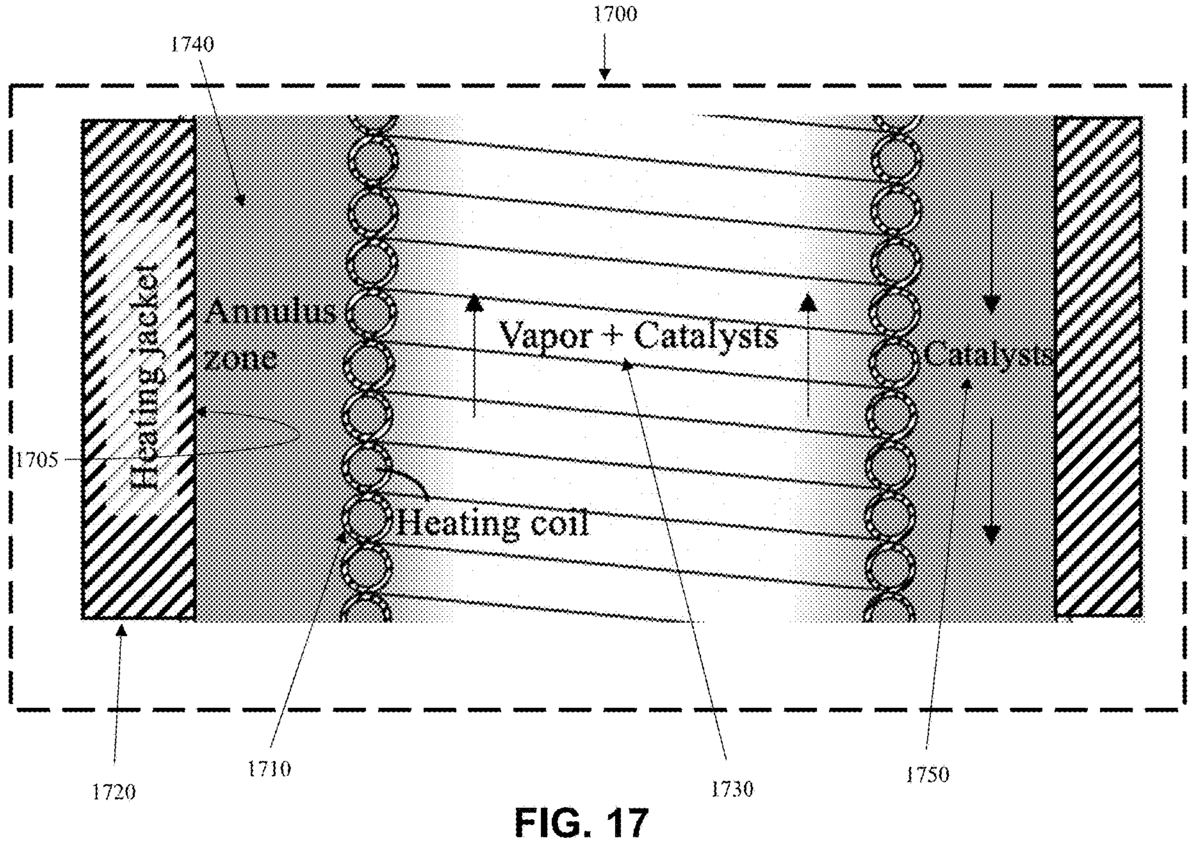
FIG. 17 is a cross-sectional view of the reactor vessel, with draft tube comprising a heating coil and a heating element surrounding at least a portion of the reactor vessel, illustrating the flow directions of vapor and catalysts.

FIG. 17 illustrates a cross-sectional view of an SBJ reactor vessel [1700] comprising: a reactor vessel wall [1705]; a draft tube made up of a heating coil [1710]; and, a heating element [1720] which surrounds at least a portion of the outside of the SBJ reactor vessel [1700] and is connected to the heating coil (not shown). FIG. 17 further illustrates: the upward flow of vapor and catalysts [1730] through the inside of the draft tube [1710]; an annulus zone [1740] formed between the outside of the draft tube [1710] and the reactor vessel wall [1705]; and, the downward flow of catalysts [1750] through the annulus zone.

Figure 18:
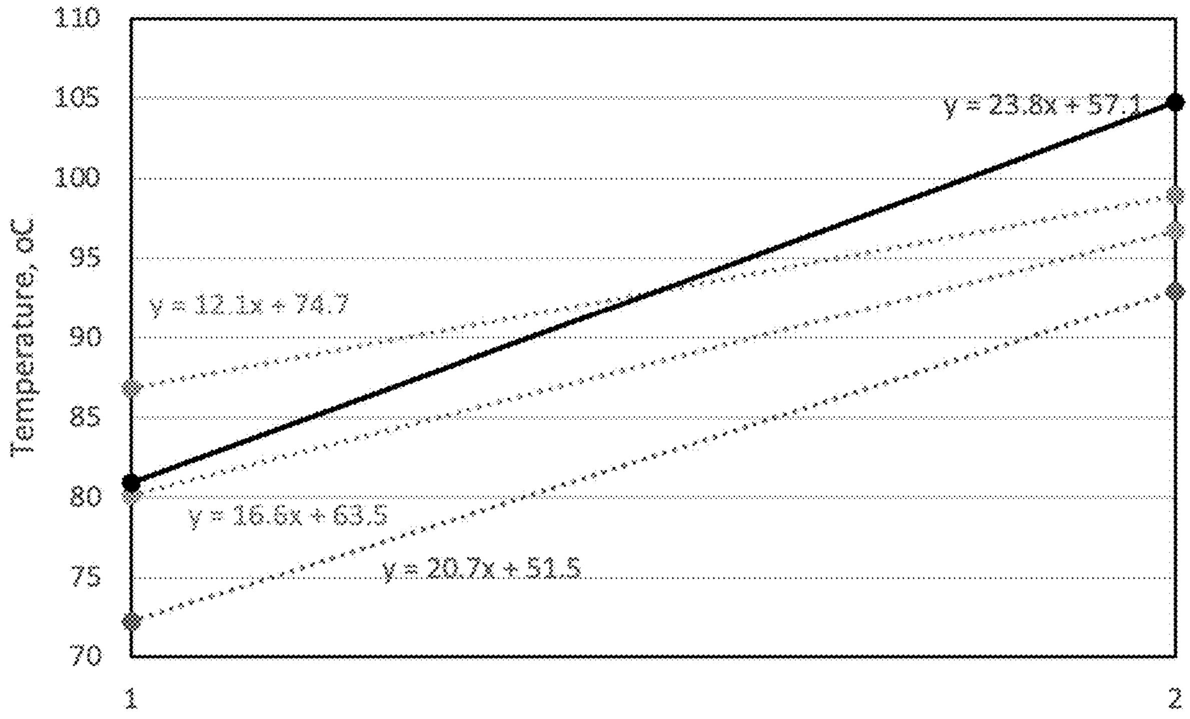
FIG. 18 is a graphical representation of the inlet the outlet temperatures for 5M MEA solvent with catalysts, produced by an experiment performed by the inventors using the set-up shown in FIG. 16.

The inlet and outlet solvent temperatures with the constant heating oil temperature and flow rate were presented in FIG. 18, which shows that the three-phase SBJ reactor with a draft tube made up of a heating coil provided better heat transfer efficiency due to the higher slope.

Figure 19:
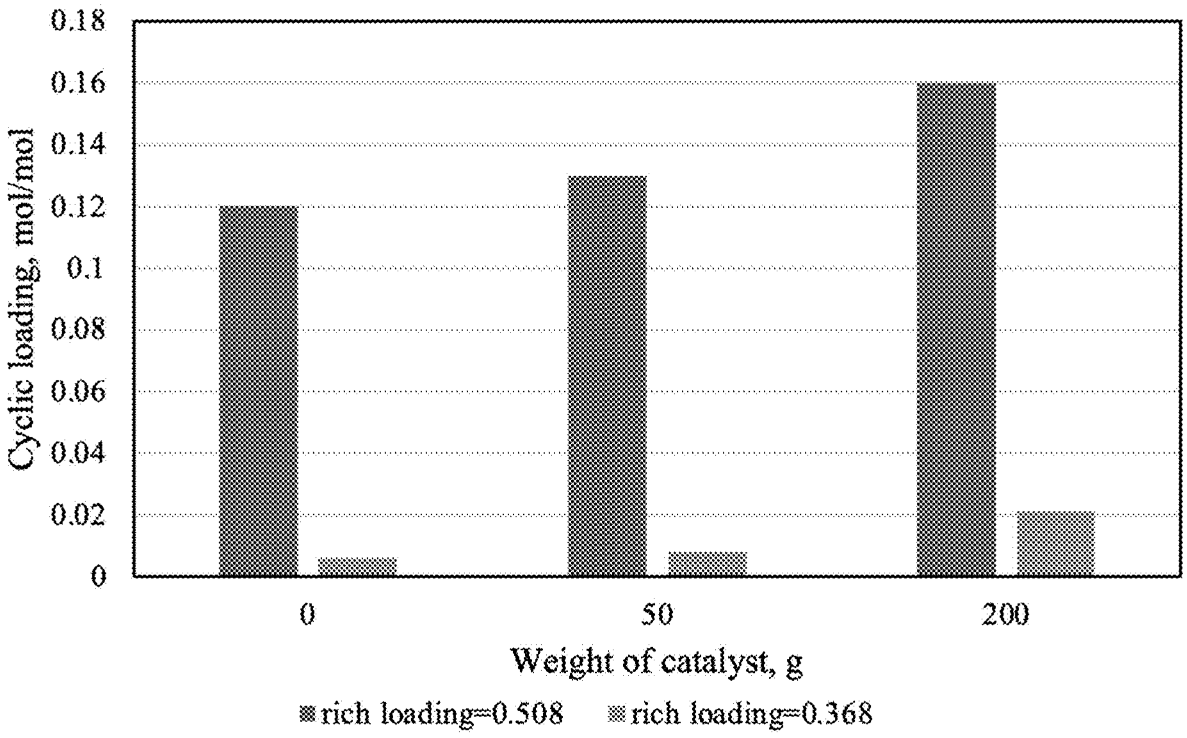
FIG. 19 is a graphical representation of cyclic loading vs. weight of catalysts at two rich loadings for 5M MEA solvent with catalysts, produced by an experiment performed by the inventors using the set-up shown in FIG. 16.

The effect of the weight of solid catalyst on the cyclic loading was shown in FIG. 19, which shows that the three-phase SBJ reactor with a draft tube made up of a heating coil can accelerate the desorption kinetics and bring the lean solvent to the equilibrium state in a shorter timeframe. The enhanced desorption kinetics can also indirectly reduce the energy penalty due to the reduced solvent demand and smaller equipment size.

Figure 20:
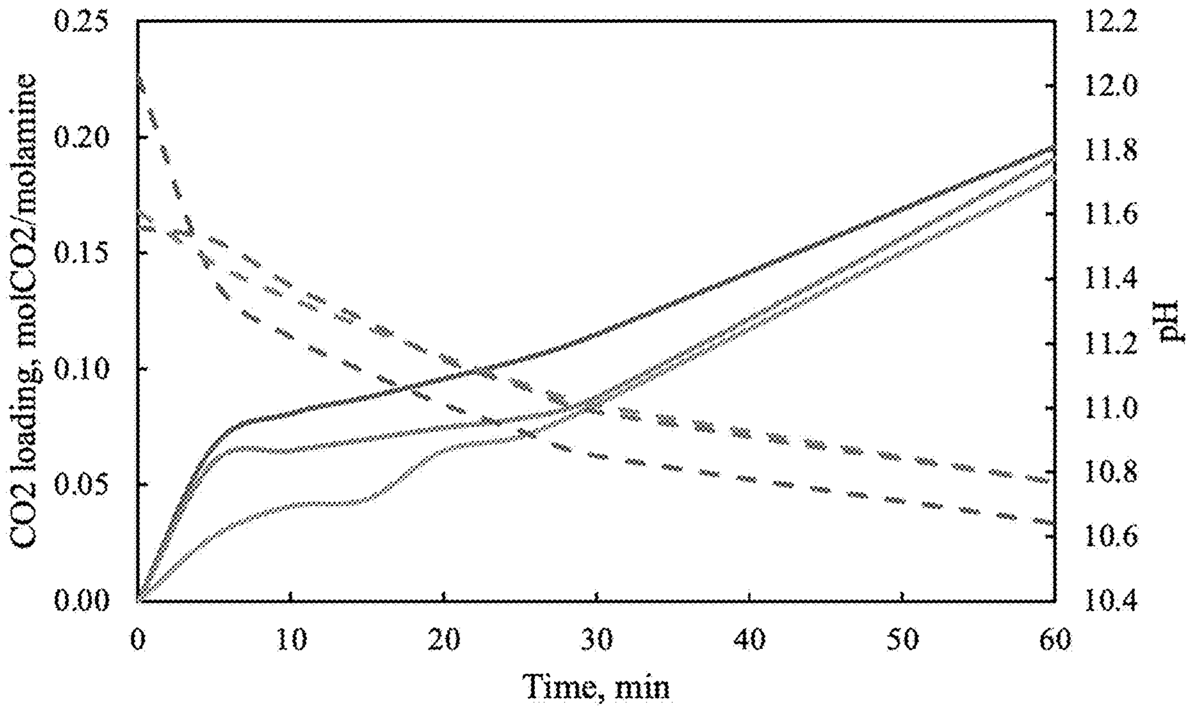
FIG. 20 is a graphical representation of the $CO_2$ loading and the pH value vs. time for 5M MEA solvent with catalysts, produced by an experiment performed by the inventors using the set-up shown in FIG. 16.

Unlike other reactors and heat exchangers, the formation of turbulence flow in the SBJ-EX does not rely on the use of stirrers and baffles. The design of SBJ-EX avoids direct contact between mechanical equipment and solid catalyst, thereby reducing the potential of catalyst attrition. The impact of catalyst attrition on the absorption process due to the changes in acidity was simulated using a batch reactor, was presented in FIG. 20. During the process, the solvent with HZSM-5 powder was stirred at the certain speed for 1 hr. It can be observed that the initial absorption rate (first half hour) rapidly reduced upon the introduction of acid catalyst powder. A clear reduction in absorption rate can be observed from FIG. 20 due to the impact of the acidity (pH). The absorption process was stopped when $CO_2$ loading reached to 0.2 mol/mol. The rich solution was allowed to stand for phase separation.

Figure 21:
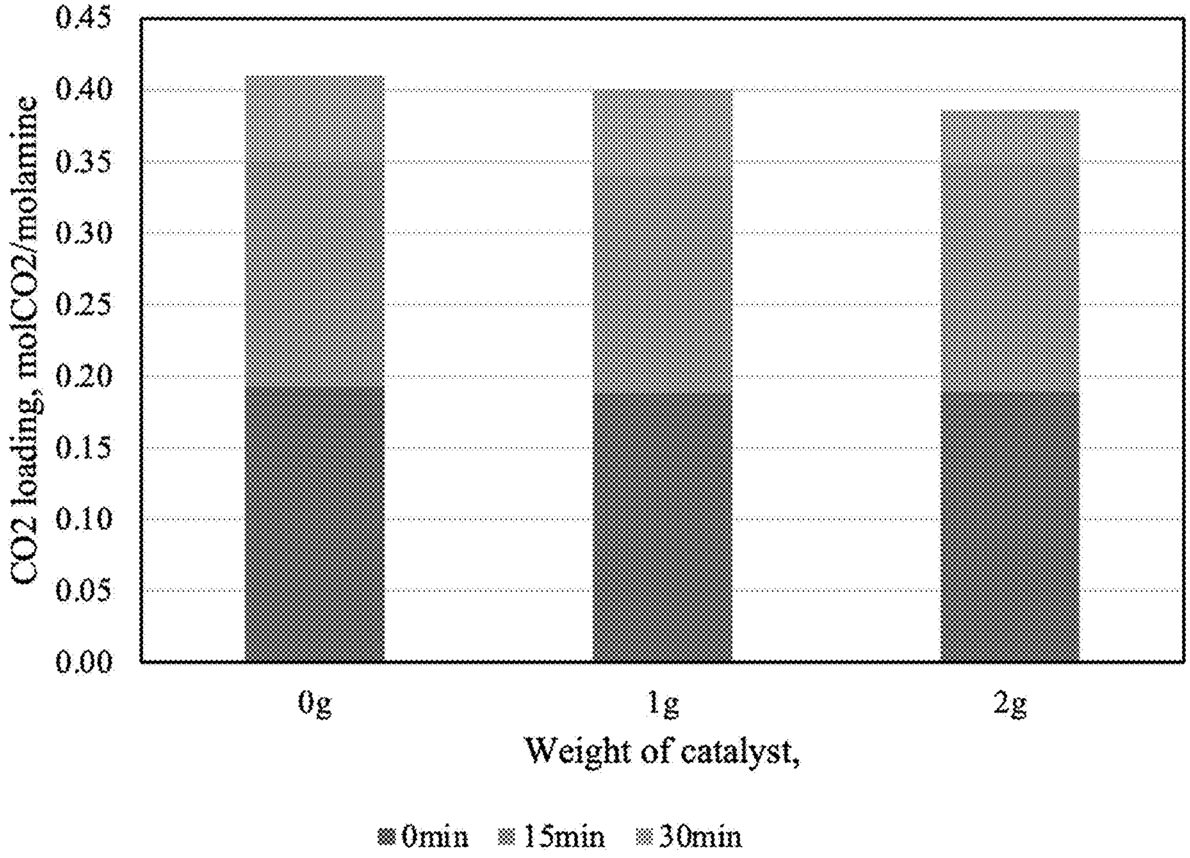
FIG. 21 is a graphical representation of the $CO_2$ loading vs. weight of catalysts for 5M MEA solvent, produced by an experiment performed by the inventors using the set-up shown in FIG. 16.
Figure 22:
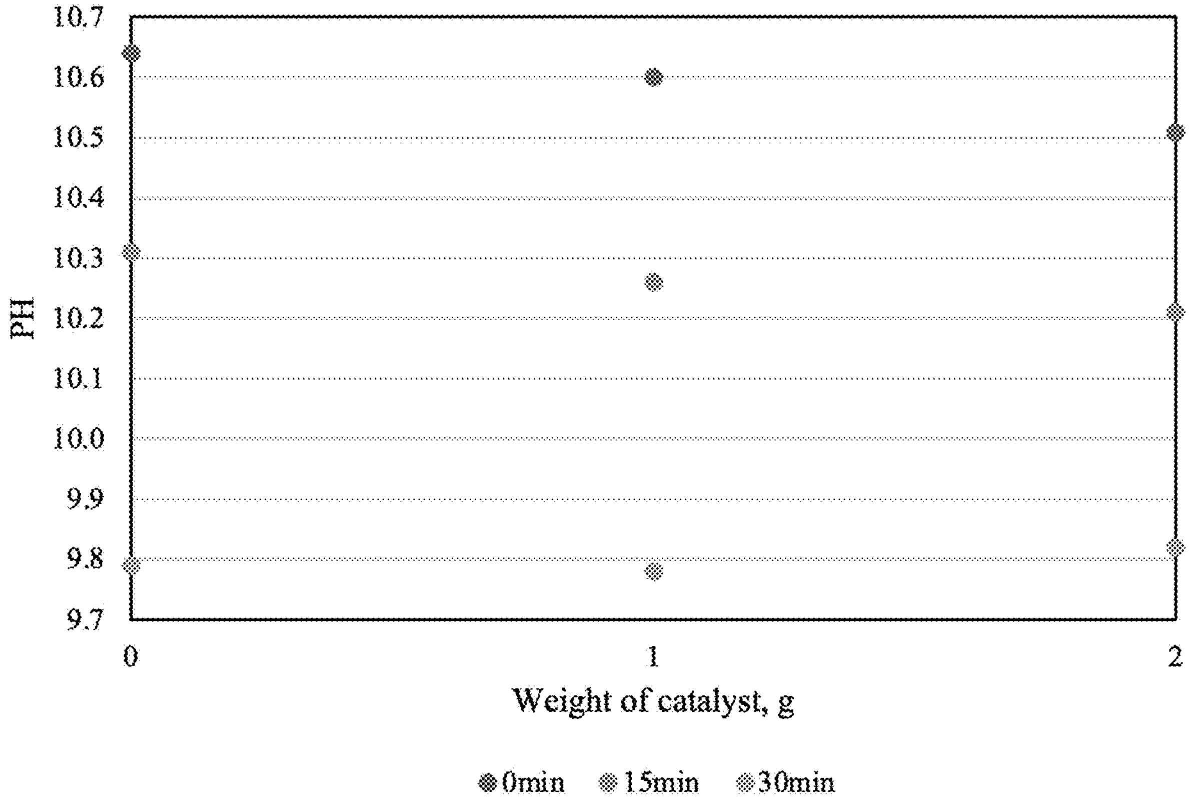
FIG. 22 is a graphical representation of the pH value vs. weight of catalysts for 5M MEA solvent, produced by an experiment performed by the inventors using the set-up shown in FIG. 16.

After separation, solid precipitation settled at the bottom, and the liquid solution remained at the top. Subsequently, 100 mL liquid solution was extracted for the cyclic loading test. The results were showed in FIG. 21 and FIG. 22. Despite the complete removal of solids, a slight influence on the absorption rate was observed during an additional 30 mins of absorption experiment. This confirms that significant catalyst attrition can adversely impact $CO_2$ absorption performance.

Figure 23:
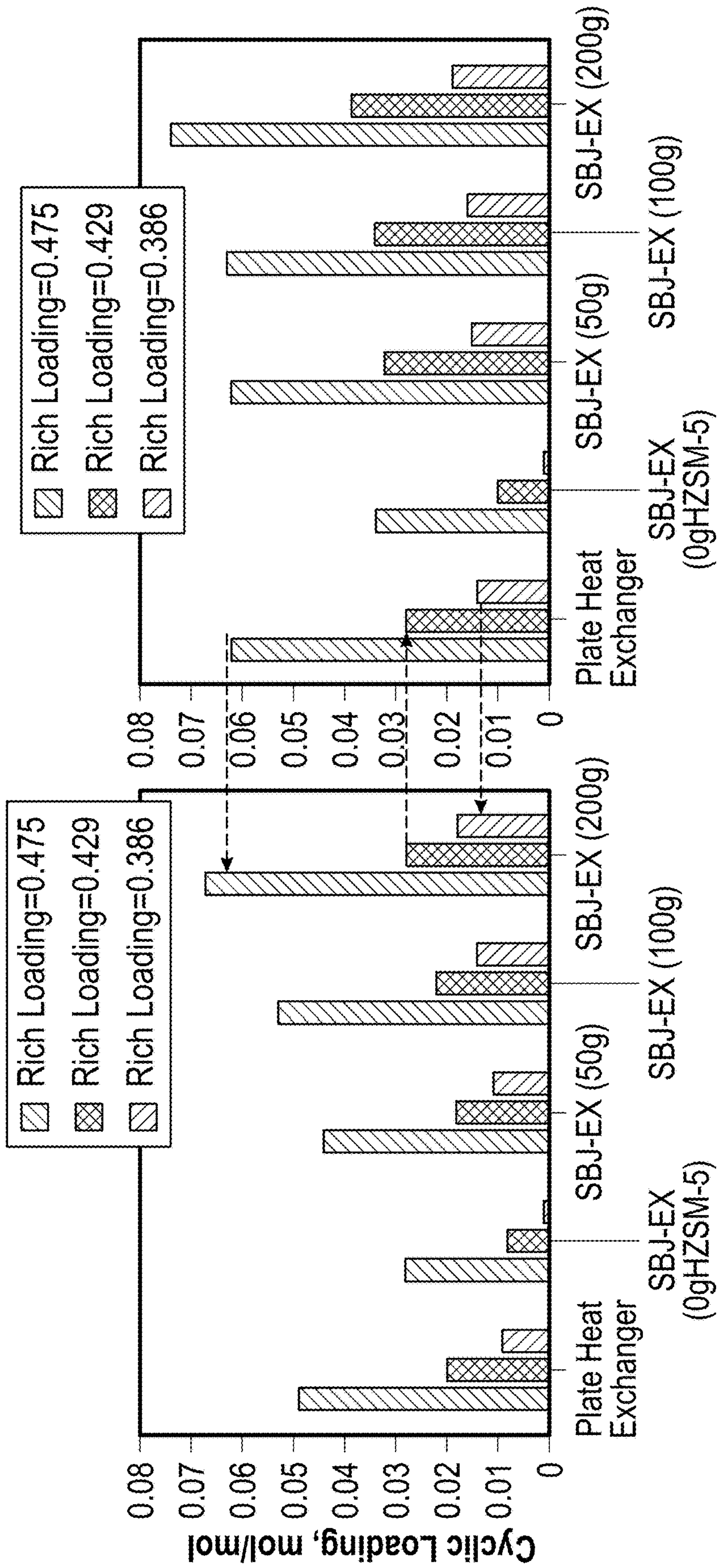
FIG. 23 is a graphical representation of the effect of rich loading on cyclic loading at two temperatures (130 and 140° C.) for 5M MEA with 200 g HZSM-5, produced by an experiment performed by the inventors using the set-up, without any outer heating element, shown in FIG. 16.

The effect of rich loading on cyclic loading at two temperatures (130° C. and 140° C.) was presented in FIG. 23. As shown in the red dash line, when using 200 g HZSM-5 catalysts, the SBJ-EX without any heating jacket exhibited slightly better $CO_2$ desorption efficiency compared to the conventional plate heat exchanger even under a lower operating temperature condition. This implies that using the SBJ can potentially reduce the energy demand of the desorption process. This also suggests that adding the heating jacket on the SBJ-EX can significantly enhance the heat transfer rate and desorption rate.

The examples and corresponding diagrams used herein are for illustrative purposes only. The principles discussed herein with reference to determination of equilibrium dissociation constants can be implemented in other systems and apparatuses. Different configurations and terminology can be used without departing from the principles expressed herein. For instance, steps, equipment, components, and modules can be added, deleted, modified, or re-arranged without departing from these principles Unless the context clearly requires otherwise, throughout the description and the claims: "comprise," "comprising," and the like are to be construed in an inclusive sense, as opposed to an exclusive or exhaustive sense; that is to say, in the sense of "including, but not limited to". "Herein," "above," "below," and words of similar import, when used to describe this specification shall refer to this specification as a whole and not to any particular portions of this specification. "Or" in reference to a list of two or more items, covers all of the following interpretations of the word: any of the items in the list, all of the items in the list, and any combination of the items in the list. The singular forms "a", "an", and "the" also include the meaning of any appropriate plural forms.

Where a component is referred to above, unless otherwise indicated, reference to that component should be interpreted as including as equivalents of that component, any component which performs the function of the described component (i.e., that is functionally equivalent), including components which are not structurally or compositionally equivalent to the disclosed structure or composition which performs the function in the illustrated exemplary implementations of the invention.

Specific examples of compositions, systems, methods and apparatuses have been described herein for purposes of illustration. These are only examples. Many alterations, modifications, additions, omissions and permutations are possible within the practice of this invention. This invention includes variations on described compositions that would be apparent to the skilled addressee, including variations obtained by: replacing features, elements and/or chemical compounds with equivalent features, elements and/or chemical compounds; mixing and matching of features, elements and/or chemical compounds from different examples; combining features, elements and/or chemical compounds from examples as described herein with features, elements and/or chemical compounds of other technology; omitting and/or combining features, elements and/or chemical compounds from described examples.

It is therefore intended that the following appended claims and claims hereafter introduced are interpreted to include all such modifications, permutations, additions, omissions and sub-combinations as may reasonably be inferred. The scope of the claims should not be limited by the preferred embodiments set forth in the examples, but should be given the broadest interpretation consistent with the description as a whole.

The invention claimed is:

1. A process for the separation of $CO_2$ from $CO_2$-containing amine solvents through desorption comprising the following steps:

(a) introducing a solid particulate material to an empty spouted bed reactor comprising:

(i) a reactor body having a cylindrical wall defining a longitudinal axis and an internal diameter, said reactor body comprising: a base, an inlet orifice, and a top;

(ii) a draft tube defining an inlet and an outlet positioned centrally along said longitudinal axis within and connected to said reactor body and said inlet being positioned proximal to said inlet orifice;

(iii) a nozzle located at said base of, and optionally protruding through said base into, the reactor body and positioned to accept steam/vapour from at least one steam/liquid inlet and feed such steam/vapour into said base;

(iv) said at least one steam/vapor inlet fluidly connected to said nozzle;

(v) at least one liquid inlet fluidly connected to the nozzle;

(vi) at least one liquid outlet proximal to said top of the reactor body; and (vii) optionally, a heating element surrounding at least a portion of said reactor body;

(b) diverting a first portion of a lean solvent stream directly to said at least one liquid inlet of said spouted bed reactor, wherein said lean solvent comprises $CO_2$;

(c) introducing a second portion of said lean solvent stream to a first reboiler of a thermal solvent regenerator, wherein said first reboiler provides a first outlet stream and a second outlet stream, wherein said first outlet stream is directed to said thermal solvent regenerator and said second outlet stream is directed to a crosshead heat exchanger;

(d) allowing sufficient residence time of said first portion of a lean solvent stream in the spouted bed reactor to remove a predetermined amount of $CO_2$ from said $CO_2$-containing amine solvents, thereby generating a processed lean solvent, said processed lean solvent exiting the spouted bed reactor at said outlet thereof;

(e) introducing said processed lean solvent to a second reboiler to generate hot vapor, wherein said second reboiler provides a first outlet stream and a second outlet stream, wherein said first outlet stream is introduced to said base of said spouted bed reactor through said nozzle and said second outlet stream is directed to said crosshead heat exchanger;

(f) said hot vapor forming a turbulent flow when it combines with said first portion of lean solvent, the turbulent flow causing said solid particulate material to flow upwards through the draft tube;

(g) upon exiting said draft tube the solid particulate material flows in a downward direction with the turbulent flow along an annulus formed between said draft tube and said cylindrical wall;

(h) adjusting the temperature of the hot vapor to be greater than the temperature of the first portion of said lean solvent; and (i) optionally, adjusting the split ratio of the lean solvent based on the operating conditions in the spouted bed reactor vessel wherein said operating conditions are selected from the group consisting of: temperature, flow rate, pressure, and solvent properties.

* * * * *